(12) United States Patent
Kasajima et al.

(10) Patent No.: US 6,894,873 B2
(45) Date of Patent: May 17, 2005

(54) SUSPENSION AND HEAD GIMBAL ASSEMBLY WITH THE SUSPENSION

(75) Inventors: Tamon Kasajima, Kwai Chung (HK); Masashi Shiraishi, Kwai Chung (HK)

(73) Assignee: Sae Magnetics (H.K.) Ltd., Kwai Chung (HK)

( * ) Notice: Subject to any disclaimer, the term of this patent is extended or adjusted under 35 U.S.C. 154(b) by 141 days.

(21) Appl. No.: 10/125,349

(22) Filed: Apr. 19, 2002

(65) Prior Publication Data

US 2002/0154448 A1 Oct. 24, 2002

(30) Foreign Application Priority Data

Apr. 23, 2001 (JP) ........................................ 2001-124242

(51) Int. Cl.[7] .............................................. G11B 5/60
(52) U.S. Cl. ............................. 360/245.3; 360/234.6; 360/245; 360/245.1; 360/245.5
(58) Field of Search ........................ 360/234.6, 244.2, 360/245, 245.1, 245.3, 245.4, 245.5

(56) References Cited

U.S. PATENT DOCUMENTS

| | | | | |
|---|---|---|---|---|
| 5,428,489 A | * | 6/1995 | Takamure et al. | 360/244.2 |
| 5,659,448 A | * | 8/1997 | Shimizu et al. | 360/245.1 |
| 6,084,748 A | * | 7/2000 | Ito et al. | 360/246.1 |
| 6,115,221 A | * | 9/2000 | Utsunomiya | 360/245.1 |
| 6,381,104 B1 | * | 4/2002 | Soeno et al. | 360/294.4 |
| 6,400,532 B1 | * | 6/2002 | Mei | 360/245.1 |
| 6,618,220 B2 | * | 9/2003 | Inagaki et al. | 360/78.05 |
| 2002/0154446 A1 | * | 10/2002 | Kasajima et al. | 360/245.3 |
| 2003/0007290 A1 | * | 1/2003 | Kasajima et al. | 360/245.4 |
| 2003/0193751 A1 | * | 10/2003 | Ohwe et al. | 360/245.1 |

FOREIGN PATENT DOCUMENTS

| | | | |
|---|---|---|---|
| JP | 8-212739 A | * | 8/1996 |
| WO | WO 96/10820 A1 | * | 4/1996 |

* cited by examiner

*Primary Examiner*—Jefferson Evans
(74) *Attorney, Agent, or Firm*—Burns, Doane, Swecker & Mathis, L.L.P.

(57) ABSTRACT

A suspension includes a load beam, a flexure fixed to the load beam for determining a flying attitude of a head slider provided with at least one head element, the flexure having a slider supporting section for supporting the head slider, and a load adjustment mechanism formed at the slider supporting section of the flexure, for adjusting a load imposed on the head slider.

30 Claims, 24 Drawing Sheets

SUSPENSION AND HEAD GIMBAL ASSEMBLY WITH THE SUSPENSION

FIELD OF THE INVENTION

The present invention relates to a suspension for a head element such as a thin-film magnetic head element or an optical head element and a head gimbal assembly (HGA) with the suspension.

DESCRIPTION OF THE RELATED ART

In a magnetic disk drive apparatus (HDD), thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, the miniaturization of HDD, accompanied by increasing in data storage capacities and densities of the HDD, has progressed, and therefore a further downsized and more light-weight magnetic head slider and an HDD capable of operating at a higher rotation speed are demanded.

A suspension for supporting such a downsized and light-weight magnetic head slider is required not only to precisely control a load imposed to the slider but also to have a sufficiently high resonance frequency and an excellent resistance performance to wind resistance.

In general, a load applied to the magnetic head slider is adjusted by means of a bending section additionally formed as a part of a load beam of the suspension near its base plate. Namely, the load beam at a position near the base plate is slightly bent to form the bending section so that a top end section of the load beam presses the magnetic head slider mounted toward a magnetic disk. The load applied to the magnetic head slider can be adjusted by controlling a bent angle of this bending section.

However, forming of such a bending section onto the load beam greatly lowers a resonance frequency of the whole suspension due to a complex shape of the bent load beam. Thus, the lowered resonance frequency may be laid within a frequency band used for the servo mechanism causing a high speed operation of the servo to be difficult.

Also, if such a bending section is formed onto the load beam, the suspension will be seriously susceptible to wind resistance. Namely, side winds produced due to a high-speed rotation of the magnetic disk will be directly applied to and thus exert a large influence upon the bending section causing random vibrations of the suspension to occur. Particularly, the influence of the wind resistance becomes large in case of a recent high end HDD in which the magnetic disk rotates at a high speed of 10,000 to 15,000 rpm or more.

Furthermore, since the bending section has a low stiffness, a top end section of the suspension will receive a large impact if a shock toward its up-and down directions (Z-directions) is applied to the suspension causing a shock resistance of the whole suspension to be extremely poor.

In addition, according to the conventional HGA with a bending section for adjusting a load applied to the magnetic head slider by controlling its bent angle, not only the fabrication process is complicated but also a precise adjustment of the load cannot be expected. Particularly, because the load value to be adjusted decreases as the magnetic head slider becomes light in weight, any variation in the adjusted load cannot be negligible and therefore a load tolerance increases.

SUMMARY OF THE INVENTION

It is therefore an object of the present invention to provide a suspension and an HGA with the suspension, whereby a resonance frequency of the HGA can be increased.

Another object of the present invention is to provide a suspension and an HGA with the suspension, whereby wind-resistance performance of the HGA can be increased.

Further object of the present invention is to provide a suspension and an HGA with the suspension, whereby a resistance against a shock of Z-directions can be increased.

Still further object of the present invention is to provide a suspension and an HGA with the suspension, whereby a manufacturing process of the HGA can be simplified and a load tolerance can be kept smell.

According to the present invention, a suspension includes a load beam, a flexure (or gimbal) fixed to the load beam for determining a flying attitude of a head slider provided with at least one head element, the flexure having a slider supporting section for supporting the head slider, and a load adjustment mechanism formed at the slider supporting section of the flexure, for adjusting a load imposed on the head slider.

Also, according to the present invention, an HGA with the suspension and a head slider with at least one head element will be provided.

The suspension has a load adjustment mechanism formed at the slider supporting section of the flexure, for adjusting a load imposed on the head slider. Therefore, it is unnecessary that the load beam of the HGA has a bending section for imposing a load, and thus the load beam can be formed by a member with a sufficient stiffness resulting a resonance frequency of the suspension to increase. Accordingly, a frequency band for a servo can be broadened and thus a high speed seek operation of the servo can be expected. The increased stiffness of the suspension provides improvement in a shock resistance of the HGA against a Z-direction impact.

Also, since the load beam which has a large side sectional area and receives side winds no bending section for imposing a load, influence of wind resistance can be suppressed to a minimum. Furthermore, since the imposed load is adjusted by controlling the load adjustment mechanism instead of controlling a bending angle of a bending section, not only a manufacturing process of the HGA can be simplified and a manufacturing cost of the HGA can be reduced, but also the imposed load can be adjusted with a high accuracy and a small tolerance.

It is preferred that the load adjustment mechanism is formed directly underneath a load point onto the head slider.

It is also preferred that a projection or dimple formed on the load beam functions as the load point.

It is also preferred that the load adjusting mechanism comprises a frame section, and a spring plate section for controlling the load imposed on the head slider, at least one end of the spring plate section being supported by the frame section. In this case, preferably, the load adjustment mechanism is formed by a multilayer structure including a first thin metal plate layer, a resin layer laminated on the first thin metal plate layer and a second thin metal plate layer laminated on the resin layer, and the spring plate section consists of a part of the first or second thin metal plate layer. The load adjustment mechanism may be formed by a single layer structure of a thin metal plate layer, and a spacer member, and the spring plate section consists of a part of the thin metal plate layer.

It is further preferred that the load adjustment mechanism is unitarily formed with the flexure, or individually formed from the flexure.

Preferably, the load beam is configured to have a high stiffness. In this case, the load beam may consist of a single plate member. The load beam may have no load adjustment mechanism for adjusting a load imposed on the head slider.

It is also preferred that the suspension further includes a back-bending section capable of bending a part of the suspension at the time of mounting of an HGA to an HDD.

It is further preferred that the back-bending section is configured by partially narrowing a width of the load beam, or the back-bending section is configured by a resilient member coupled to the load beam.

It is preferred that the at least one head element is at least one thin-film magnetic head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
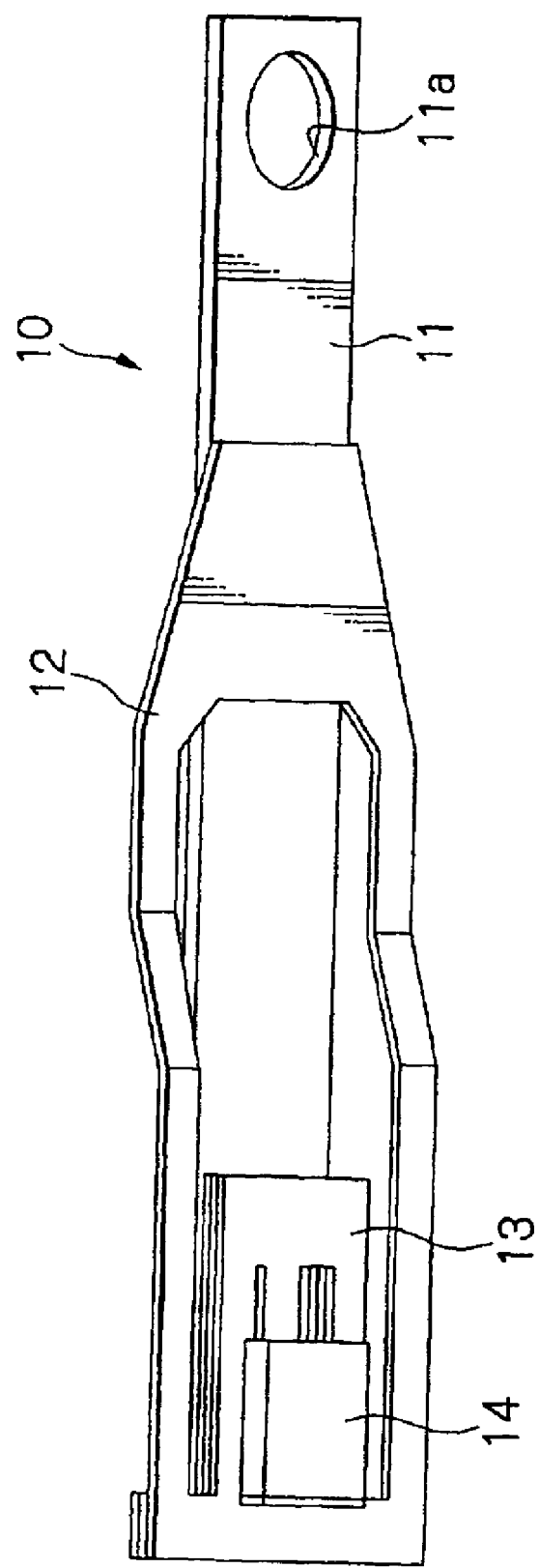
FIG. 1 is an oblique view schematically illustrating the whole structure of an HGA in a preferred embodiment according to the present invention.
Figure 2:
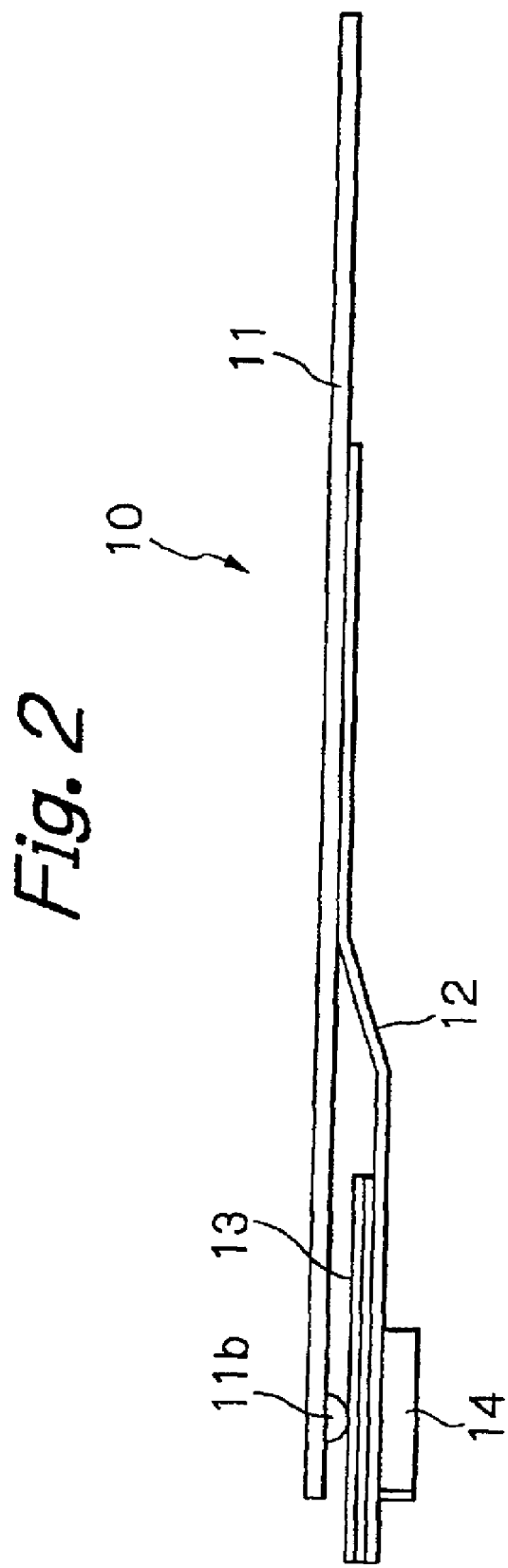
FIG. 2 is a side view of the HGA in the embodiment of FIG. 1.
Figure 3:
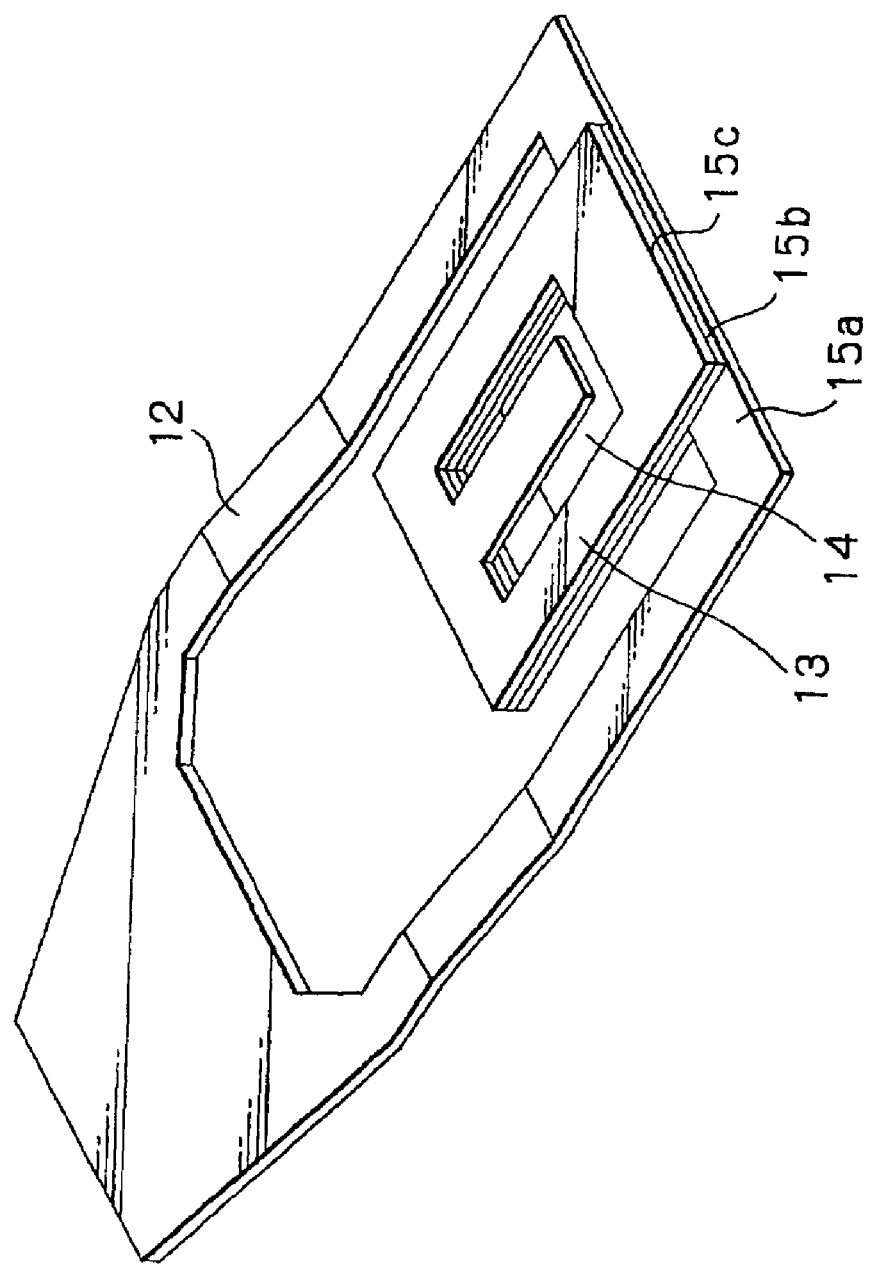
FIG. 3 is an oblique view illustrating only a flexure and a magnetic head slider in the embodiment of FIG. 1.
Figure 4:
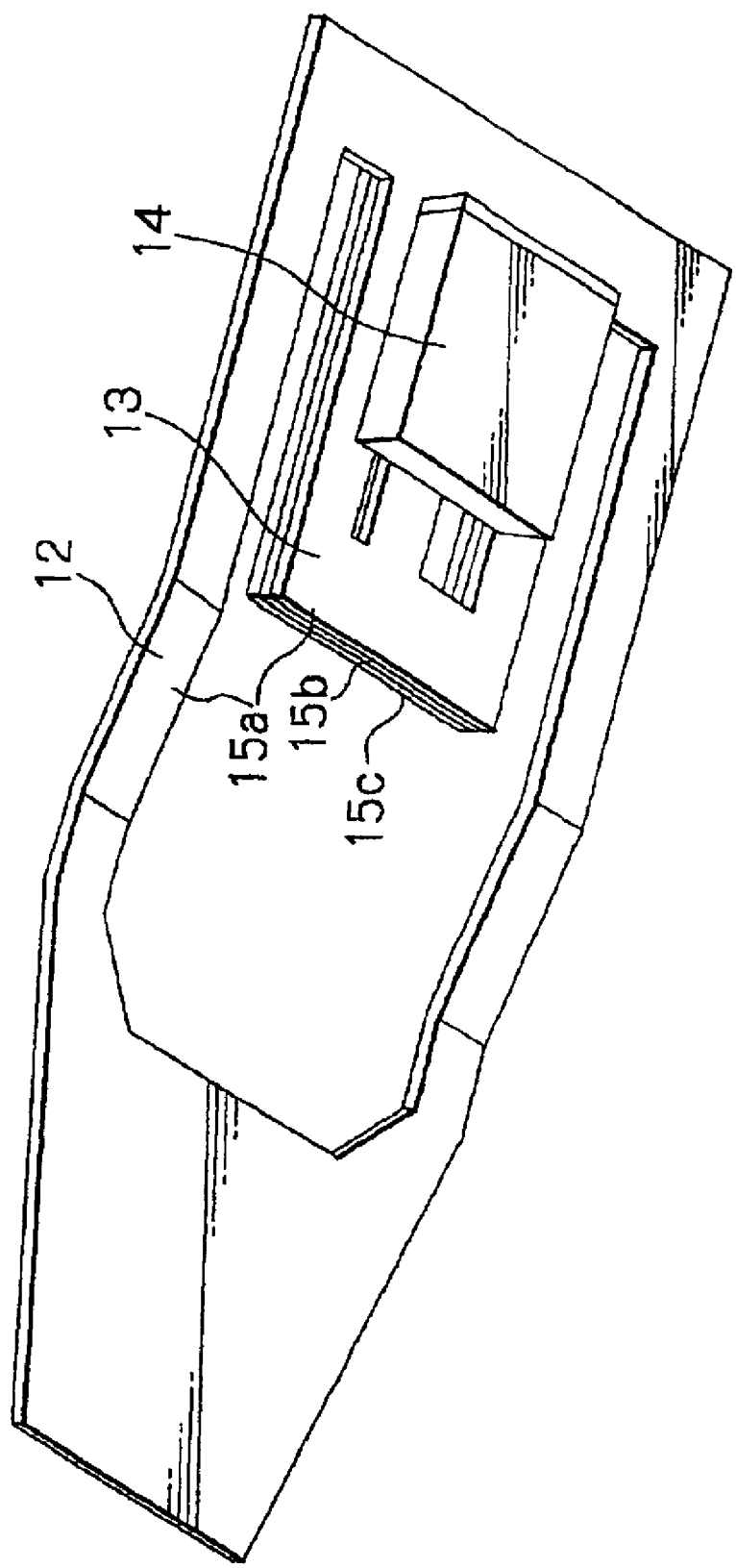
FIG. 4 is an oblique view illustrating only the flexure and the magnetic head slider in the embodiment of FIG. 1, seen from different direction from that of FIG. 3.
Figure 5:
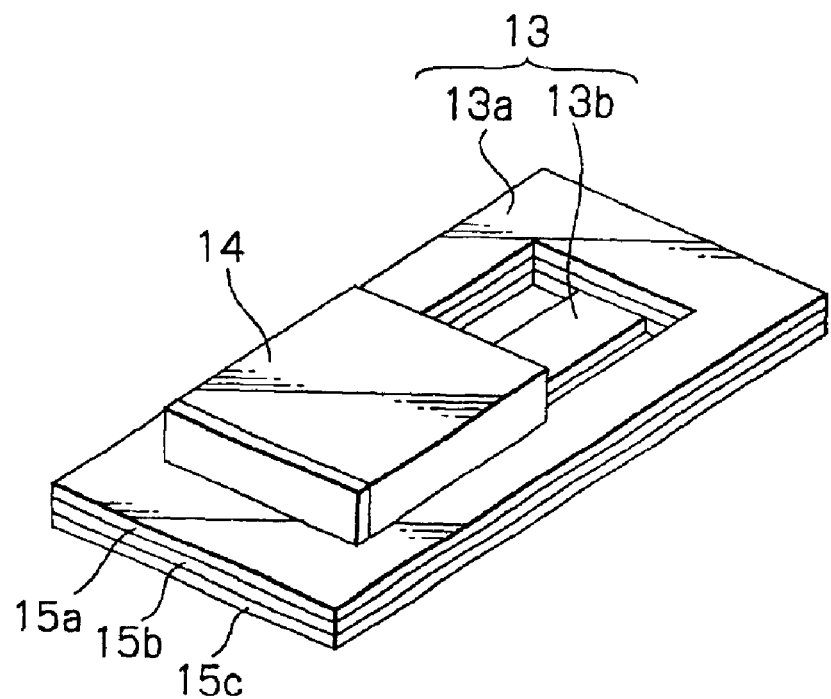
FIG. 5 is an oblique view illustrating only a load adjustment mechanism and the magnetic head slider in the embodiment of FIG. 1.
Figure 6:
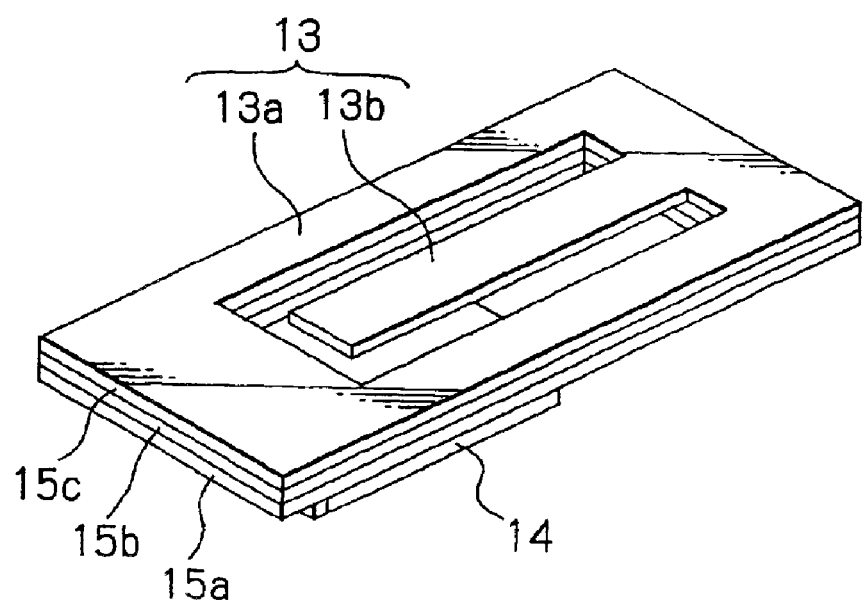
FIG. 6 is an oblique view illustrating only the load adjustment mechanism and the magnetic head slider in the embodiment of FIG. 1, seen from different direction from that of FIG. 5.
Figure 7A:
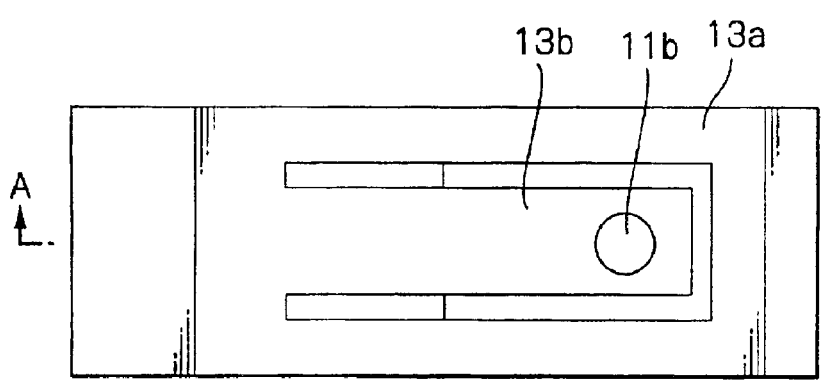
FIGS. 7a to 7c are a plane view, an elevation view and a side view illustrating only the load adjustment mechanism and the magnetic head slider in the embodiment of FIG. 1.
Figure 7B:
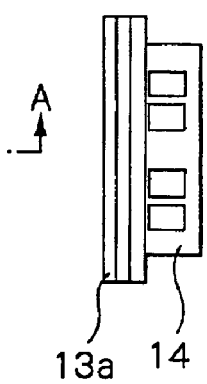
Figure 7C:
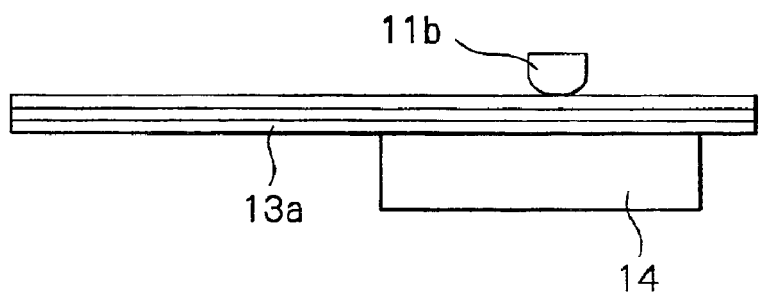
Figure 8:
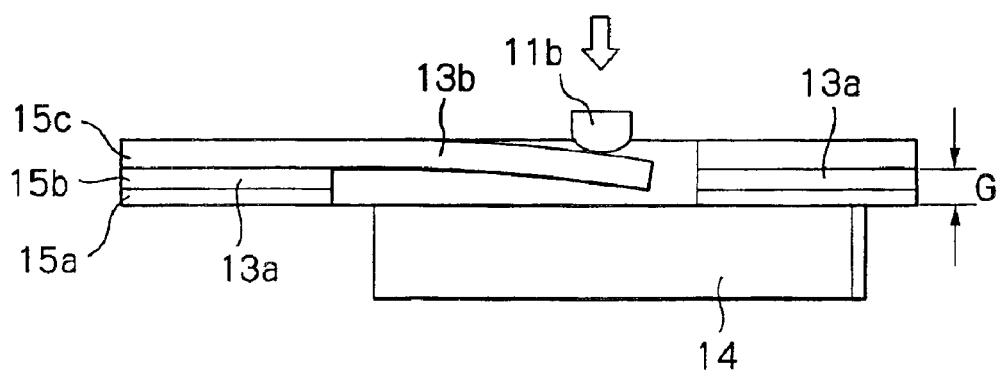
FIG. 8 is an A—A line sectional view of FIG. 7.

FIG. 1 schematically illustrates the whole structure of an HGA in a preferred embodiment according to the present invention, FIG. 2 is a side view of the HGA shown in FIG. 1, FIG. 3 illustrates only a flexure and a magnetic head slider in the embodiment of FIG. 1, FIG. 4 illustrates only the flexure and the magnetic head slider in the embodiment of FIG. 1, seen from different direction from that of FIG. 3, FIG. 5 illustrates only a load adjustment mechanism and the magnetic head slider in the embodiment of FIG. 1, FIG. 6 illustrates only the load adjustment mechanism and the magnetic head slider in the embodiment of FIG. 1, seen from different direction from that of FIG. 5, FIGS. 7a to 7c illustrate only the load adjustment mechanism and the magnetic head slider in the embodiment of FIG. 1, and FIG. 8 is an A-A line sectional view of FIG. 7.

In this embodiment, the load adjustment mechanism is fabricated unitarily with the flexure. As shown in these figures, a suspension 10 consists of a load beam 11 formed by a plane plate member, the flexure (or gimbal) 12 fixed to and supported by the load beam 11 and the load adjustment mechanism 13 united with the flexure 12.

The HGA is configured by fixing a magnetic head slider 14 provided with at least one thin-film magnetic head element to the load adjustment mechanism 13 of the suspension 10, and by executing electrical connection of trace conductors (not shown) to the magnetic head element.

The load beam 11 is made of in this embodiment a single plane metal plate member such as for example a stainless steel plate with a relatively large thickness and has no bending section. The fixing of the load beam 11 with the flexure 12 is performed by pinpoint welding at a plurality of points.

The load beam 11 has an attaching hole 11a used for attaching the HGA to a drive arm (not shown) of the HDD at its rear end section, and a projection or dimple 11b that is a load point at its top end section.

The flexure 12 and the load adjustment mechanism 13 in this embodiment are fabricated by sequentially laminating a first stainless steel thin plate 15a, a resin layer 15b made of a polyimide resin for example and a second stainless steel thin plate 15c to form a three-layered plate member, and by etching the three-layered plate member in a predetermined layer or layers and into a predetermined pattern.

The flexure 12 in this embodiment is formed, as shown in FIGS. 3 and 4, as a single layer structure of only the first stainless steel thin plate 15a patterned in a predetermined shape.

The load adjustment mechanism 13 is configured by, as clearly shown in FIGS. 5 and 6, a frame section 13a formed in a rectangular shape and a spring plate section 13b formed in a frame of the frame section 13a. One end of the spring plate section 13b is united with an inside edge of the frame section 13a. The frame section 13a is formed in a three-layered structure of the first stainless steel thin plate 15a, the resin layer 15b and the second stainless steel thin plate 15c to keep a sufficient stiffness. Whereas the spring plate section 13b is formed in a single layer structure of only the first stainless steel thin plate 15a and has a resilience.

As shown in FIGS. 7 and 8, the spring plate section 13b is formed to locate directly underneath the dimple 11a namely the load point. When the dimple 11a depresses this resilient spring plate section 13b, this spring plate section 13b becomes deformed and forces back. Thus, the load applied to the magnetic head slider 14 is determined to a value when the both forces are balanced.

In this embodiment, the spring plate section 13b formed directly underneath the dimple 11a provides load adjustment functions. By adjusting a width, a thickness and a length of the spring plate section 13b, a desired load with respect to a given Z-height is obtained. The spring plate section 13b is bent when depressed by the dimple 11a. Thus, it is necessary to form a gap G shown in FIG. 8 for avoiding abutment of the top end of the spring plate section 13b to the magnetic head slider 14. This gap G is provided in this embodiment by the total thickness of the first stainless steel thin plate 15a and the resin layer 15b. It is possible to reduce a clearance between the dimple 11b and the magnetic head slider 14 without changing the produced load by somewhat bending the spring plate section 13b toward the dimple 11b. Keeping the clearance small is effective at obtaining a good resonance characteristics of the HGA.

The flexure 12 and the load adjustment section 13 with such structure are fabricated by etching a three-layered plate member or sheet from both sides to selectively and simultaneously remove a partial region of the first stainless steel thin plate 15a, a partial region of the resin layer 15b and a partial region of the second stainless steel thin plate 15c over their full thickness.

The stainless steel plate may be etched using an acid such as $FeCl_3$ (ferric chloride). Such acid selectively etches only the stainless steel plate but does not etch the polyimide layer at all. Thus, the polyimide resin layer 15b operates as a stop layer and therefore within an etched region the first stainless steel thin plate 15a and the second stainless steel thin plate 15c are completely removed over the whole thickness. Accordingly, it is possible to easily control the etched depth at constant.

The polyimide resin layer 15b may be etched by an wet etching using an alkali such as KOH (potassium hydroxide) or by a dry etching using for example $O_2$ plasma or $CF_4$ plasma. Such wet or dry etching selectively etches only the polyimide layer but does not etch the stainless steel plate at all. Thus, the first stainless steel thin plate 15a and the second stainless steel thin plate 15c operate as stop layers and therefore within an etched region only the polyimide resin layer 15b is completely removed.

The electrical conductor member consisting of trace conductors connected to the magnetic head element of the magnetic head slider 14 may be configured by a flexible conductor member with the trace conductors, directly formed on the flexure 12, or by a preliminarily fabricated flexible conductor sheet with the trace conductors, adhered on the flexure 12.

As mentioned above, according to this embodiment, the load beam 11 of the suspension has no bending section for imposing a load but is formed by a plane plate member with a sufficient stiffness to keep the Z-height. Thus, the suspension is unaffected by the resonance characteristics of the low-stiffness bending section of the conventional load beam. As a result, all resonance frequencies of the suspension in a sway mode (oscillation mode toward lateral directions of the suspension), a torsion mode (twisting mode around the longitudinal axis of the suspension) and a bending mode (oscillation mode toward up-and down directions of the suspension) of the load beam can be increased. These sufficient high resonance frequencies of the suspension can provide a high speed seek operation of the servo.

Also, according to the embodiment, since the load beam 11 of the suspension has no bending section for imposing a load, it is possible to provide a high stiffness to the load beam which has a large side sectional area and receives side winds. Thus, non-linear movement of the HGA due to the side winds produced by extremely high rotations of the magnetic disk can be suppressed to the minimum extent.

Furthermore, according to the embodiment, since the load beam 11 has no bending section for imposing a load but has a high stiffness as a whole, bending of a top end of the HGA towards the up-and-down directions can be suppressed at a minimum even when a Z-direction impact is applied to the HGA resulting a shock resistance of the HGA to extremely improve. Therefore, various shock countermeasure mechanisms adopted in recent HGAs such as a limiter mechanisms for limiting a moving amount of the flexure and a ramp loading mechanism for separating the HGA from the magnetic-disk surface at the time of un-operation for example can be omitted. Thus, the number of components of the HGA can be reduced resulting a manufacturing cost of the HGA to lower.

A value of applied load to the magnetic head slider 14 is determined from the Z-height and from shape and size of the spring plate section 13b of the load adjustment mechanism 13. As the spring plate section 13b is formed by executing photo-processes without performing bending of the load beam, the load value can be precisely adjusted with no variation. Therefore, even if the magnetic head slider becomes light in weight and thus a nominal value of the load lowers, a desired load value applied to the magnetic head slider can be expected with a high accuracy and a small tolerance. Also, as mentioned before, a bending process for somewhat bending the spring plate section 13b toward the dimple 11b may be performed.

Since the load beam 11 is formed by a single plate member, the number of components of the HGA reduces and the number of the fixing positions reduces. Thus, the manufacturing process is simplified, the manufacturing cost is reduced and also the yield is enhanced. In addition, since it is not necessary to strictly adjust a bending angle of a bending section for imposing a load, the manufacturing process is further simplified, the manufacturing cost is reduced and also the yield is improved.

The suspension in this embodiment has a simple structure of the load beam and the load imposing section, and thus simulation of its characteristics can be very easily and precisely achieved.

Figure 9:
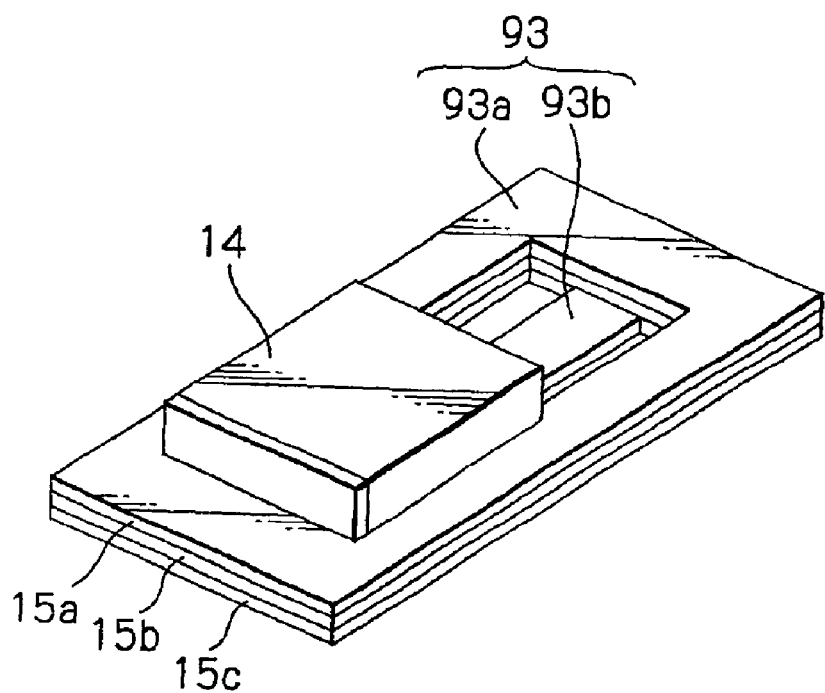
FIG. 9 is an oblique view illustrating only a load adjustment mechanism and a magnetic head slider in another embodiment according to the present invention.
Figure 10:
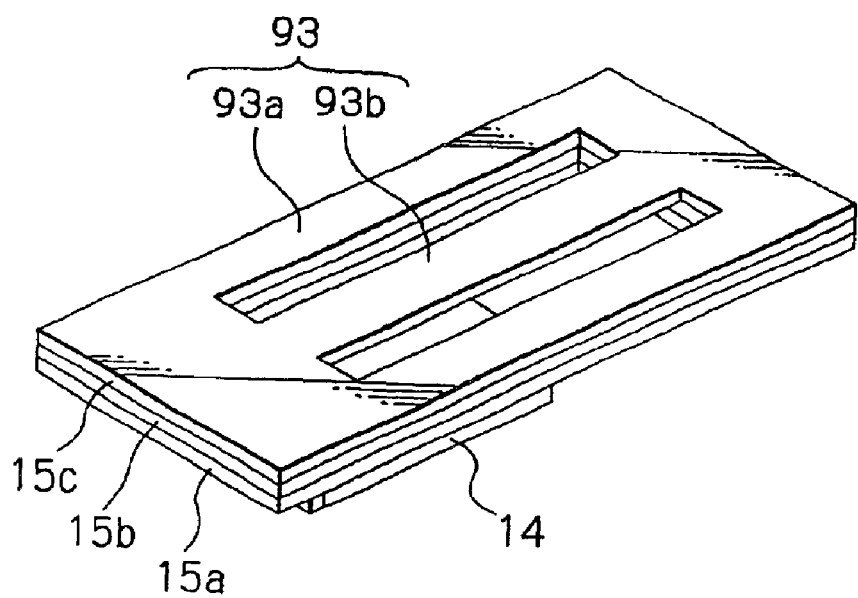
FIG. 10 is an oblique view illustrating only the load adjustment mechanism and the magnetic head slider in the embodiment of FIG. 9, seen from different direction from that of FIG. 9.

FIG. 9 illustrates only a load adjustment mechanism and a magnetic head slider in another embodiment according to the present invention, and FIG. 10 illustrates the load adjustment mechanism and the magnetic head slider, seen from different direction from that of FIG. 9.

Configurations in this embodiment except for that of a load adjustment mechanism of the HGA are the same as those in the embodiment of FIG. 1 and thus description thereof is omitted. Also, in FIGS. 9 and 10 of this embodiment, the similar elements as those in the embodiment of FIG. 1 are represented by the same reference numerals.

In this embodiment, as will be apparent from FIG. 10, the load adjustment mechanism 93 is configured by a frame section 93a formed in a rectangular shape and a spring plate section 93b formed in a frame of the frame section 93a. Both ends of the spring plate section 93b are united with inside edges of the frame section 93a. The frame section 93a is formed in a three-layered structure of the first stainless steel thin plate 15a, the resin layer 15b and the second stainless steel thin plate 15c to keep a sufficient stiffness. Whereas the spring plate section 93b is formed in a single layer structure of only the second stainless steel thin plate 15c and has a resilience.

The spring plate section 93b is formed to locate directly underneath the dimple namely the load point. When this dimple depresses this resilient spring plate section 93b, this spring plate section 93b becomes deformed and forces back. Thus, the load applied to the magnetic head slider 14 is determined to a value when the both forces are balanced.

Operations, advantages and modifications in this embodiment are the same as those in the embodiment of FIG. 1.

Figure 11:
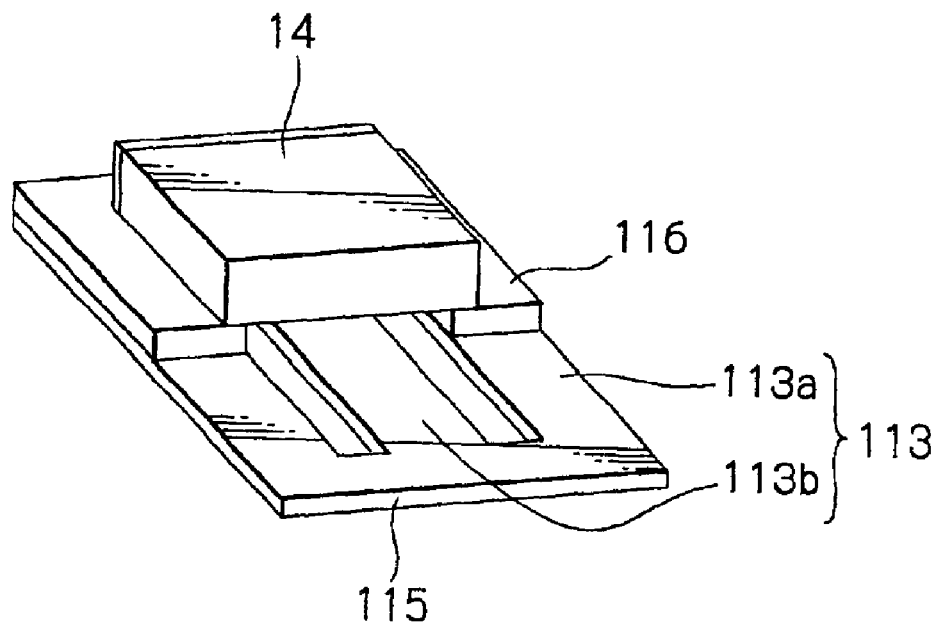
FIG. 11 is an oblique view illustrating only a load adjustment mechanism and a magnetic head slider in a further embodiment according to the present invention.
Figure 12:
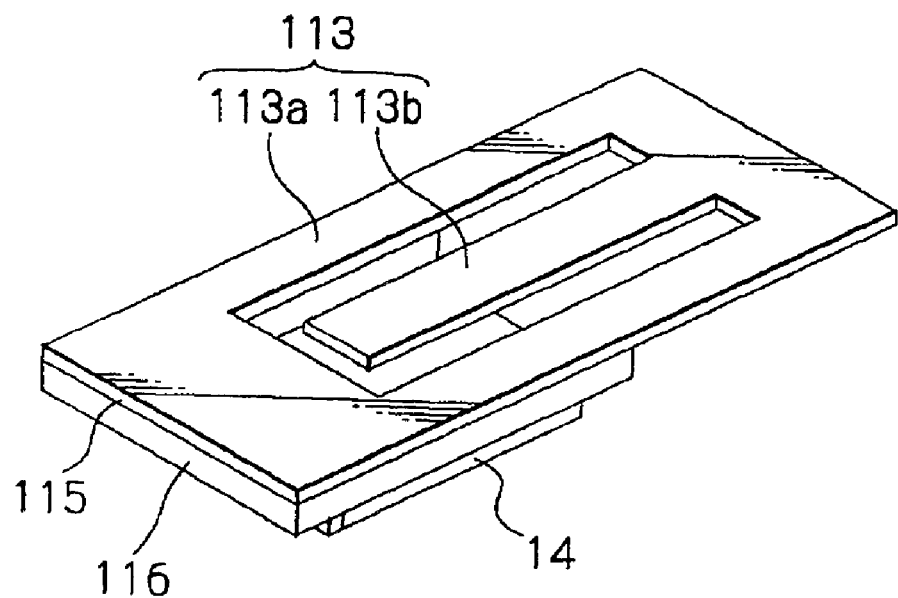
FIG. 12 is an oblique view illustrating only the load adjustment mechanism and the magnetic head slider in the embodiment of FIG. 11, seen from different direction from that of FIG. 11.
Figure 13A:
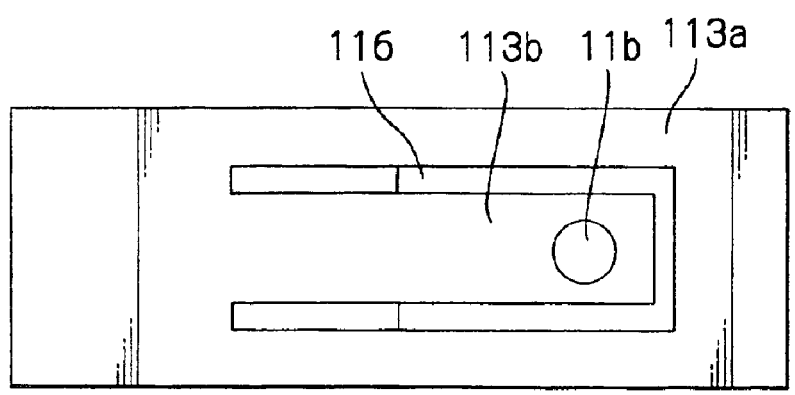
FIGS. 13a to 13c are a plane view, an elevation view and a side view illustrating only the load adjustment mechanism and the magnetic head slider in the embodiment of FIG. 11.
Figure 13B:
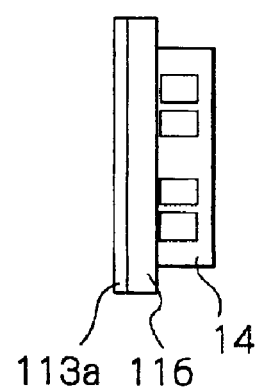
Figure 13C:
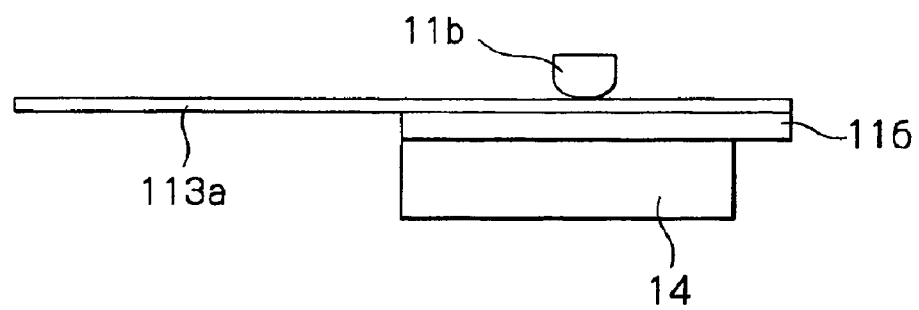

FIG. 11 illustrates only a load adjustment mechanism and a magnetic head slider in a further embodiment according to the present invention, FIG. 12 illustrates the load adjustment mechanism and the magnetic head slider seen from different direction from that of FIG. 11, and FIGS. 13a to 13c illustrate the load adjustment mechanism and the magnetic head slider in the embodiment of FIG. 11.

Configurations in this embodiment except for that of a load adjustment mechanism of the HGA are the same as those in the embodiment of FIG. 1 and thus description thereof is omitted. Also, in FIGS. 11 and 13c of this embodiment, the similar elements as those in the embodiment of FIG. 1 are represented by the same reference numerals.

In this embodiment, as will be apparent from FIG. 11 to 13b, the load adjustment mechanism 113 is configured by a frame section 113a formed in a rectangular shape and a spring plate section 113b formed in a frame of the frame section 113a. One end of the spring plate section 113b is united with an inside edge of the frame section 113a. The frame section 113a and the spring plate section 113b and also a flexure (not shown) are formed from a single stainless steel thin plate 115.

A spacer 116 is fixed on the frame section 113a, and the magnetic head slider 14 is fixed on this spacer 116. The spring plate section 113b is formed to locate directly underneath the dimple 11b namely the load point. When this dimple 11b depresses this resilient spring plate section 113b, this spring plate section 113b becomes deformed and forces back. Thus, the load applied to the magnetic head slider 14 is determined to a value when both forces are balanced.

As the spring plate section 113b is bent when a load is imposed from the dimple 11b, it is necessary to form a gap G for avoiding abutment of the top end of the section 113b to the magnetic head slider 14. This gap G is provided in this embodiment by the thickness of the spacer 116.

Operations, advantages and modifications in this embodiment are the same as those in the embodiment of FIG. 1.

Figure 14:
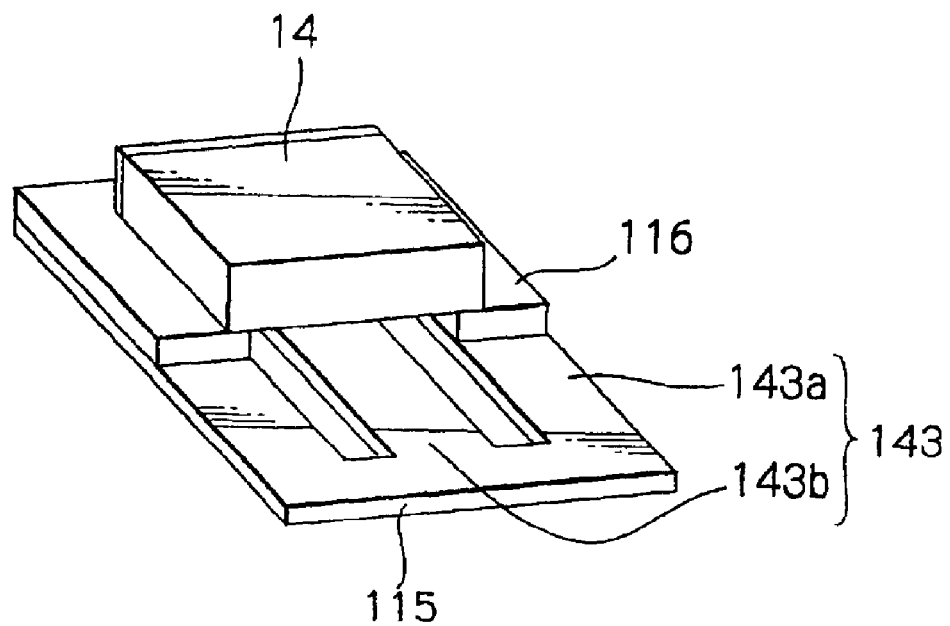
FIG. 14 is an oblique view illustrating only a load adjustment mechanism and a magnetic head slider in a still further embodiment according to the present invention.
Figure 15:
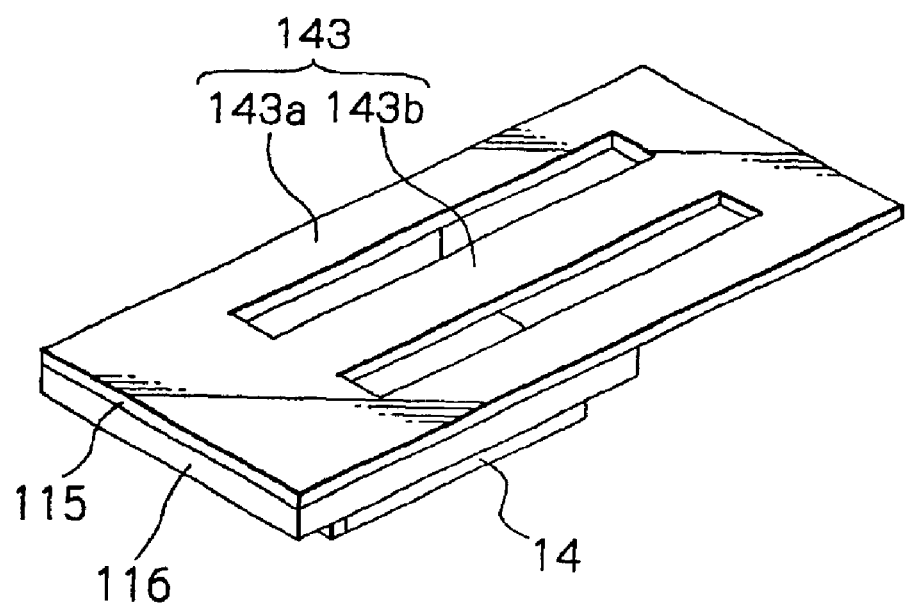
FIG. 15 is an oblique view illustrating only the load adjustment mechanism and the magnetic head slider in the embodiment of FIG. 14, seen from different direction from that of FIG. 14.

FIG. 14 illustrates only a load adjustment mechanism and a magnetic head slider in a still further embodiment according to the present invention, and FIG. 15 illustrates the load adjustment mechanism and the magnetic head slider seen from different direction from that of FIG. 14.

Configurations in this embodiment except for that of a load adjustment mechanism of the HGA are the same as those in the embodiment of FIG. 1 and thus description thereof is omitted. Also, in FIGS. 14 and 15 of this embodiment, the similar elements as those in the embodiments of FIGS. 1 and 11 are represented by the same reference numerals.

In this embodiment, as will be apparent from FIG. 15, the load adjustment mechanism 143 is configured by a frame section 143a formed in a rectangular shape and a spring plate section 143b formed in a frame of the frame section 143a. Both ends of the spring plate section 143b are united with inside edges of the frame section 143a. The frame section 143a and the spring plate section 143b and also a flexure (not shown) are formed from a single stainless steel thin plate 115.

A spacer 116 is fixed on the frame section 143a, and the magnetic head slider 14 is fixed on this spacer 116. The spring plate section 143b is formed to locate directly underneath the dimple namely the load point. When this dimple depresses this resilient spring plate section 143b, this spring plate section 143b becomes deformed and forces back. Thus, the load applied to the magnetic head slider 14 is determined to a value when the both forces are balanced.

Operations, advantages and modifications in this embodiment are the same as those in the embodiment of FIG. 1.

Figure 16:
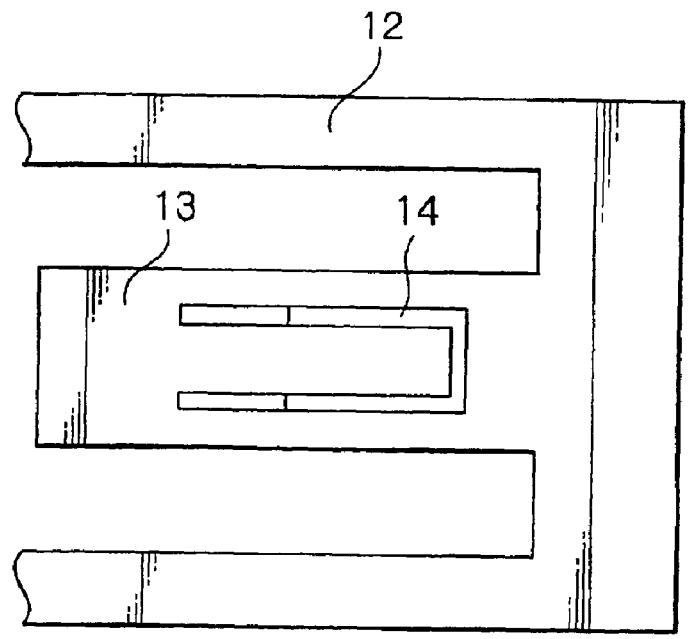
FIG. 16 is a plane view illustrating as an example a shape of the flexure and a coupling configuration between this flexure and the load adjustment mechanism.
Figure 17:
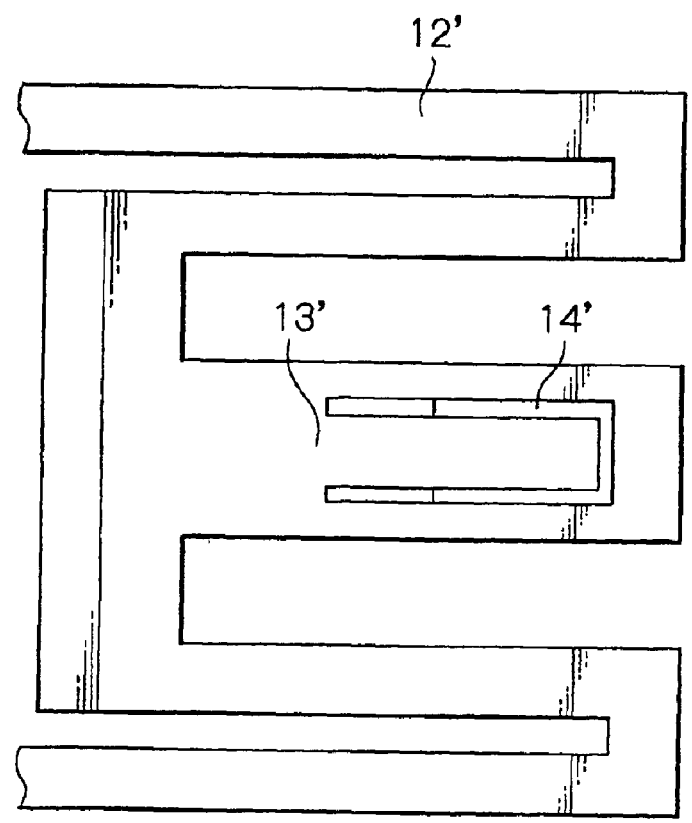
FIG. 17 is a plane view illustrating as another example a shape of the flexure and a coupling configuration between this flexure and the load adjustment mechanism.

FIGS. 16 and 17 illustrate, as examples, shapes of the flexure and coupling configurations between the flexures and the load adjustment mechanisms, respectively. In the aforementioned embodiments, the flexure 12 has a U-shape and unitarily coupled with the top end sections of the load adjustment mechanism 13 and the magnetic head slider 14 as shown in FIG. 16. However, in the HGA according to the present invention, the flexure 12' may have an M-shape and unitarily coupled with the rear end sections of the load adjustment mechanism 13' and the magnetic head slider 14' as shown in FIG. 17.

Figure 18:
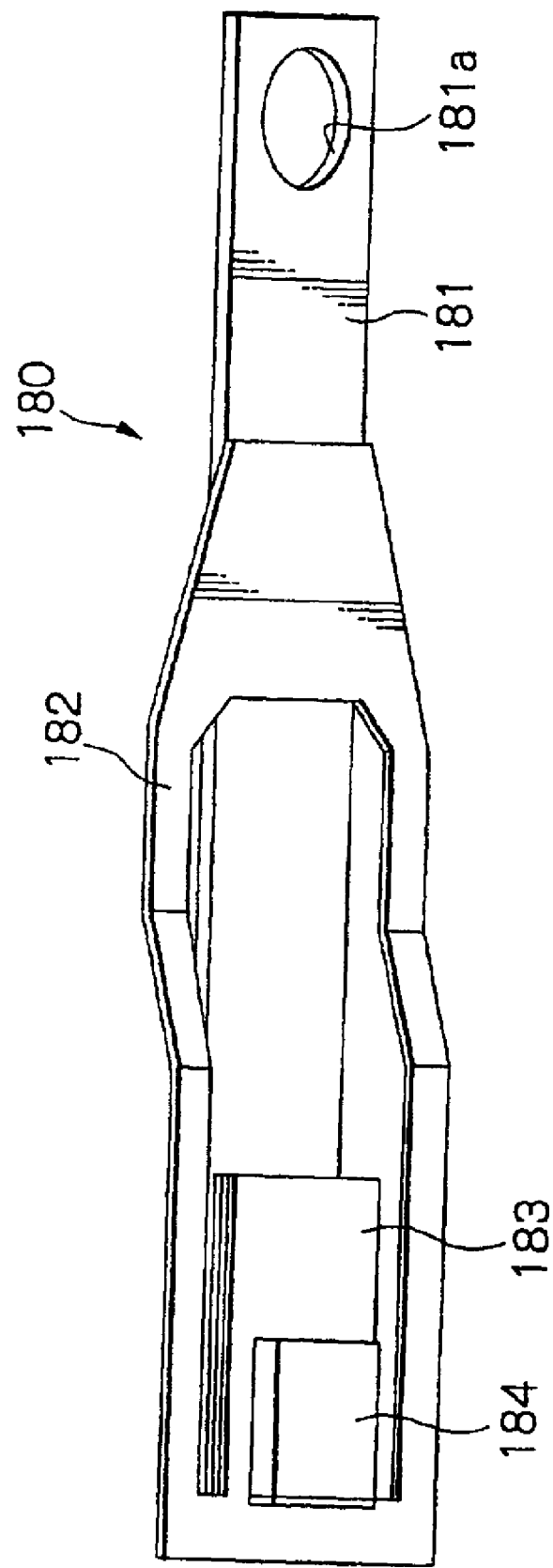
FIG. 18 is an oblique view schematically illustrating the whole structure of an HGA in a further embodiment according to the present invention.
Figure 19:
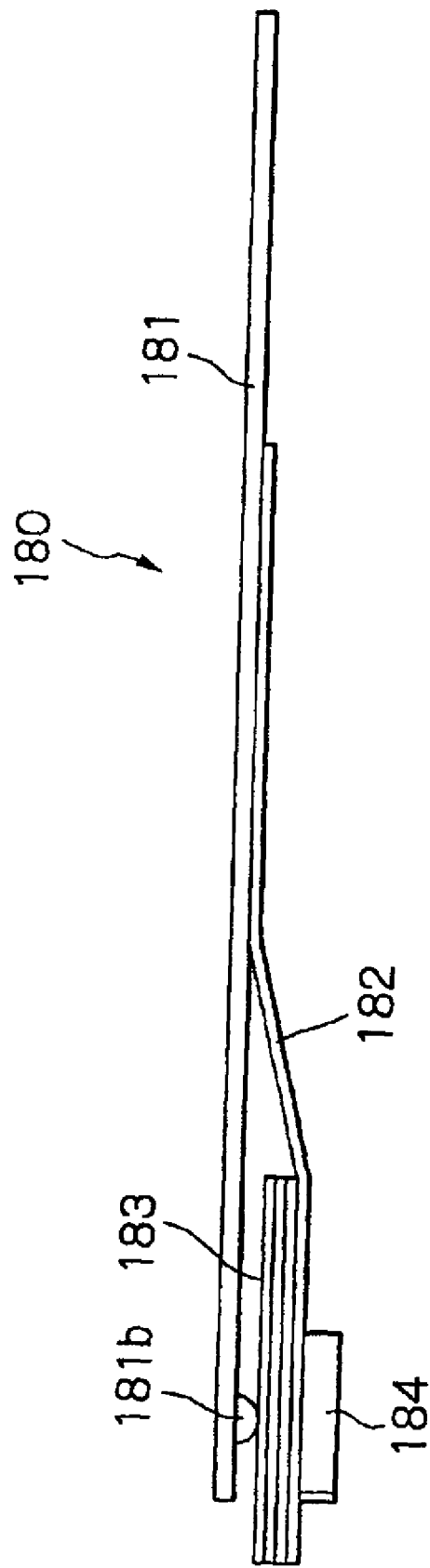
FIG. 19 is a side view of the HGA in the embodiment of FIG. 18.
Figure 20:
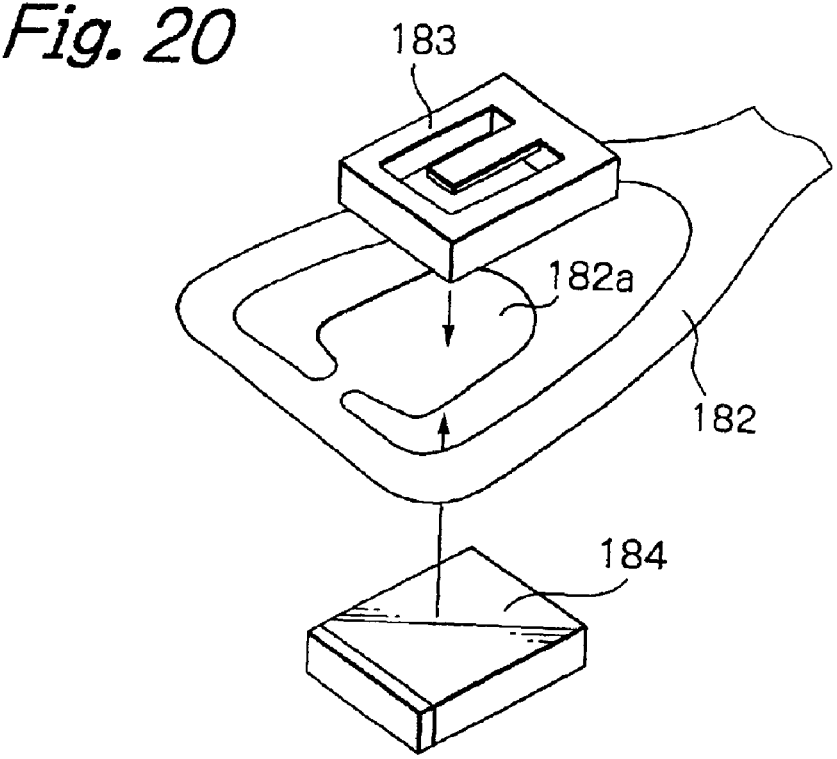
FIG. 20 is an oblique view illustrating how a load adjustment mechanism and a magnetic head slider are mounted on a flexure in the embodiment of FIG. 18.

FIG. 18 schematically illustrates the whole structure of an HGA in a further embodiment according to the present invention, FIG. 19 shows a side view of the HGA in the embodiment of FIG. 18, and FIG. 20 illustrates how a load adjustment mechanism and a magnetic head slider are mounted on a flexure in the embodiment of FIG. 18.

In this embodiment, the load adjustment mechanism and the flexure are individually fabricated and then fixed to each other. As shown in these figures, a suspension 180 consists of a load beam 181 formed by a plane plate member, the flexure 182 fixed to and supported by the load beam 181 and the load adjustment mechanism 183 separately fabricated and fixed to the flexure 182.

The HGA is configured by fixing a magnetic head slider 184 provided with at least one thin-film magnetic head element to the load adjustment mechanism 183 of the suspension 180, and by executing electrical connection of trace conductors (not shown) to the magnetic head element.

The load beam 181 is made of in this embodiment a single plane metal plate member such as for example a stainless steel plate with a relatively large thickness and has no bending section. Thus, the load beam 181 is configured to have a high stiffness. The fixing of the load beam 181 with the flexure 182 is performed by pinpoint welding at a plurality of points.

The load beam 181 has an attaching hole 181a used for attaching the HGA to a drive arm (not shown) of the HDD at its rear end section, and a projection or dimple 181b that is a load point at its top end section.

The load adjustment mechanism 183 in this embodiment is fabricated by sequentially laminating a first stainless steel thin plate, a resin layer made of a polyimide resin for example and a second stainless steel thin plate to form a three-layered plate member, and by etching the three-layered plate member in a predetermined layer or layers and into a predetermined pattern similar as the embodiment of FIG. 1.

The flexure 182 in this embodiment is formed, as will be understood from FIG. 20, as a single layer structure of a stainless steel thin plate as well as the conventional structure and has a tongue section 182a used for attaching the magnetic head slider 184.

The load adjustment mechanism 183 has the same configuration as that of the embodiment of FIG. 1 except for the separated component independently formed from the flexure. Namely, this load adjustment mechanism 183 is configured by a frame section formed in a rectangular shape and by a spring plate section formed in a frame of the frame section. One end of the spring plate section is united with an inside edge of the frame section. The frame section is formed in a three-layered structure of the first stainless steel thin plate, the resin layer and the second stainless steel thin plate to keep a sufficient stiffness. Whereas the spring plate section is formed in a single layer structure of only the second stainless steel thin plate and has a resilience.

As shown in FIG. 20, the load adjustment mechanism 183 is fixed to an upper surface of the tongue section 182a of the flexure 182 by adhering or welding and the magnetic head slider 184 is adhered to a bottom surface of the tongue section 182a. The spring plate section of the load adjustment mechanism 183 is arranged to locate directly underneath the dimple 181b namely the load point. When this dimple 181b depresses the resilient spring plate section, this spring plate section becomes deformed and forces back. Thus, the load applied to the magnetic head slider 184 is determined to a value when the both forces are balanced.

In this embodiment as well as the embodiment of FIG. 1, the spring plate section formed directly underneath the dimple 181a provides load adjustment functions. By adjusting a width, a thickness and a length of the spring plate section, a desired load with respect to a given Z-height is obtained. The spring plate section is bent when depressed by the dimple 181a. Thus, it is necessary to form a gap for avoiding abutment of the top end of the spring plate section to the magnetic head slider 184. This gap is provided in this embodiment by the total thickness of the first stainless steel thin plate and the resin layer as well as the embodiment of FIG. 1.

The electrical conductor member consisting of trace conductors connected to the magnetic head element of the magnetic head slider 184 may be configured by a flexible conductor member with the trace conductors, directly formed on the flexure 182, or by a preliminarily fabricated flexible conductor sheet with the trace conductors, adhered on the flexure 182.

Operations, advantages and modifications in this embodiment are the same as those in the embodiments of FIGS. 1 and 11.

Figure 21:
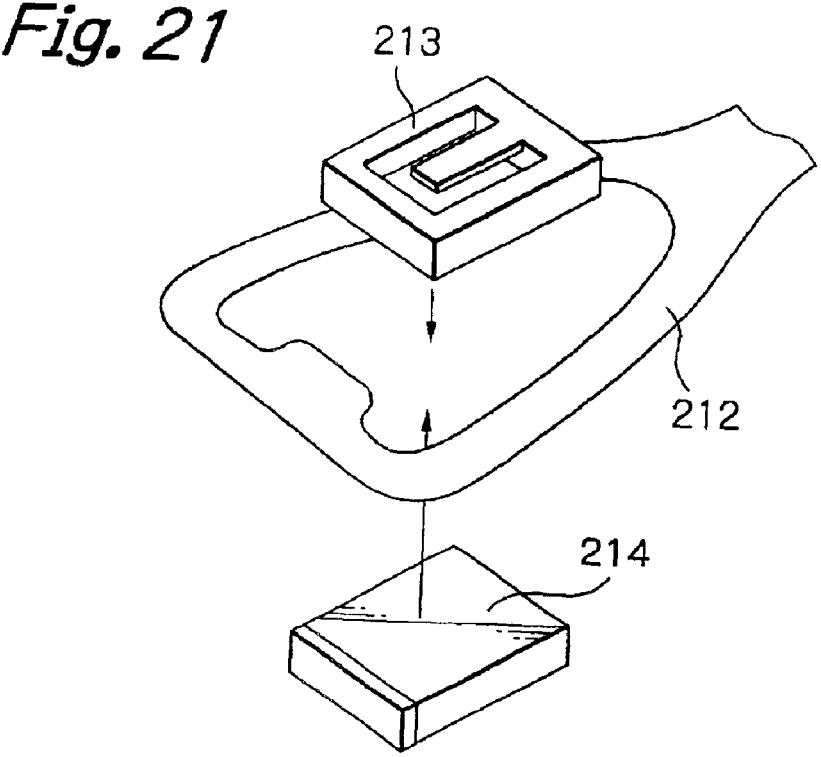
FIG. 21 is an oblique view illustrating how a load adjustment mechanism and a magnetic head slider are mounted on a flexure in modifications of the embodiment of FIG. 18.

FIG. 21 illustrates how a load adjustment mechanism and a magnetic head slider are mounted on a flexure in a modification of the embodiment of FIG. 18.

In case that trace conductors and connection pads connected to a magnetic head element of a magnetic head slider 214 are formed on a surface (lower surface in FIG. 21) of a flexure 212, a load adjustment mechanism 213 may be fixed to a frame of the flexure 212 by adhering or welding and the magnetic head slider 214 may be fixed to the flexure 212 by adhering of the slider to the flexure and/or by soldering of signal terminals of the slider to the connection pads.

Figure 22:
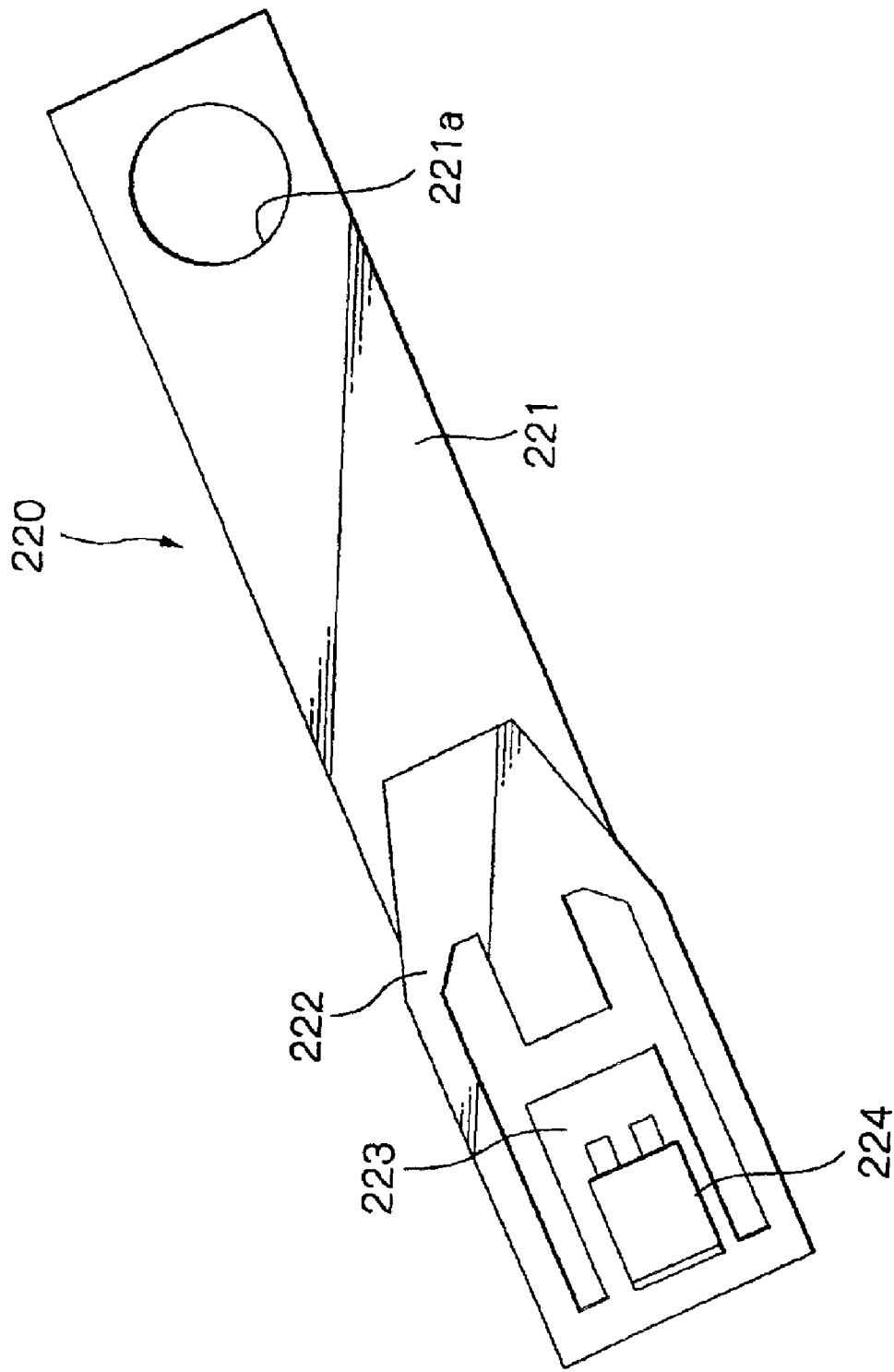
FIG. 22 is an oblique view schematically illustrating the whole structure of an HGA in a still further embodiment according to the present invention.
Figure 23:
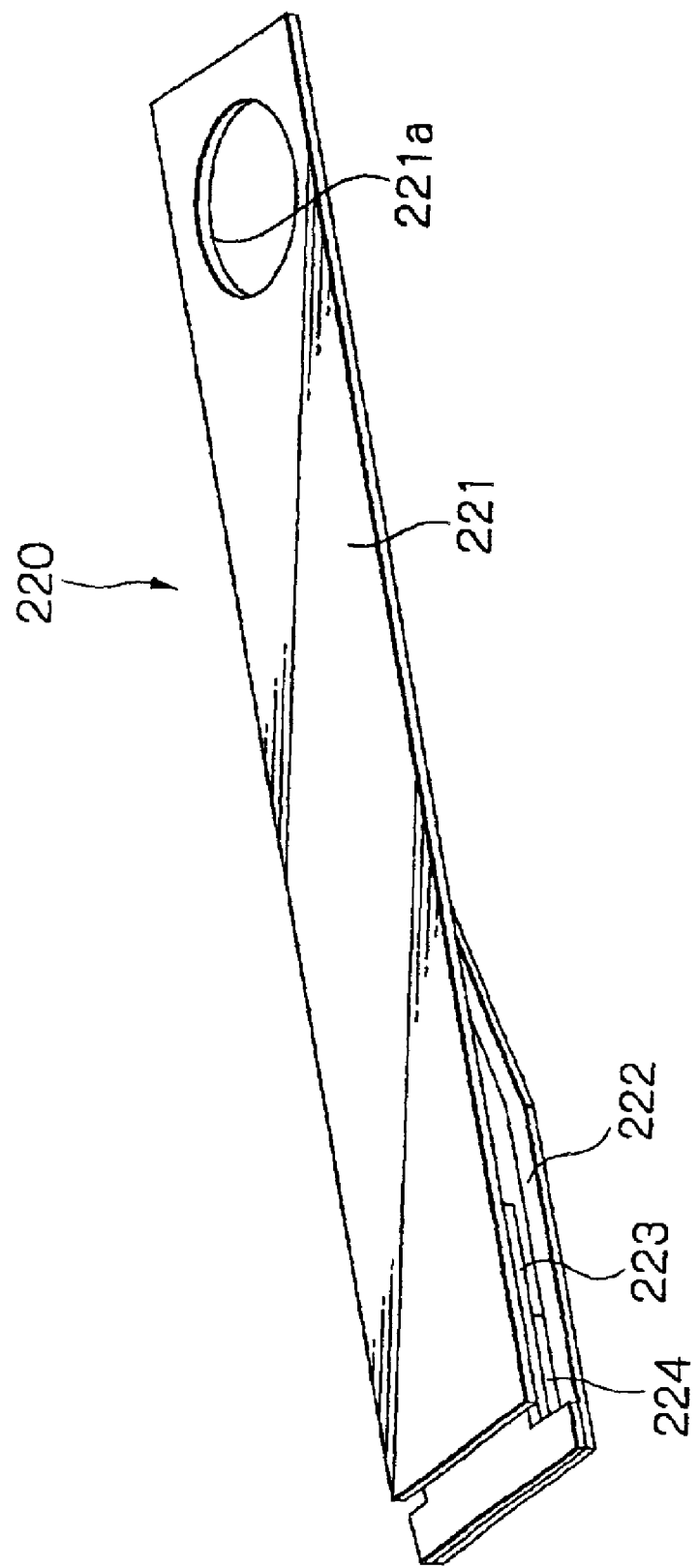
FIG. 23 is an oblique view of the HGA in the embodiment of FIG. 22.
Figure 24:
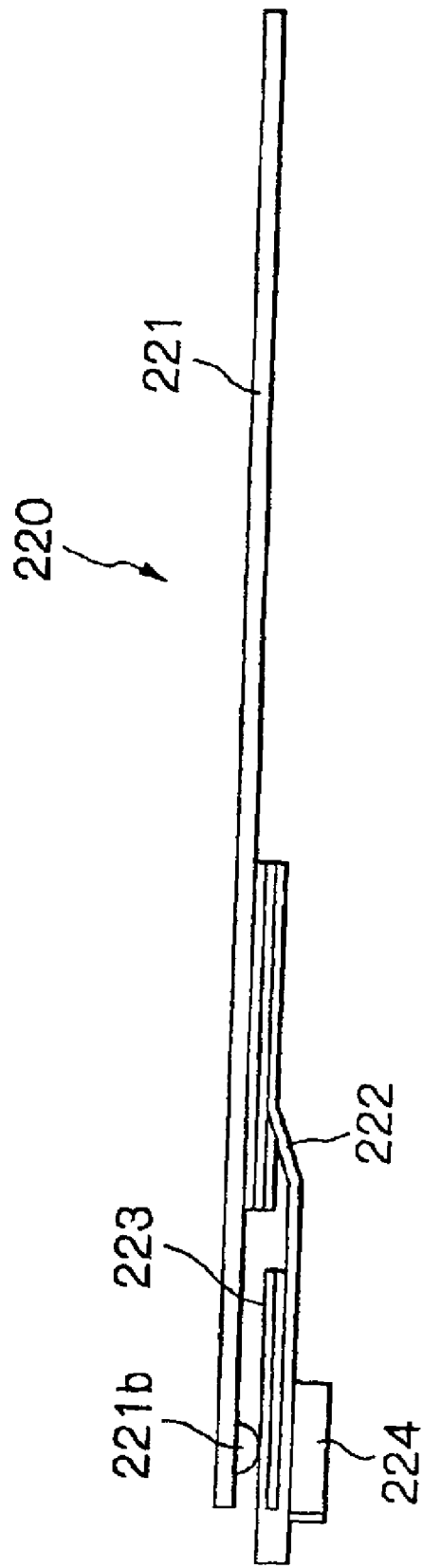
FIG. 24 is a side view of the HGA in the embodiment of FIG. 22.
Figure 25:
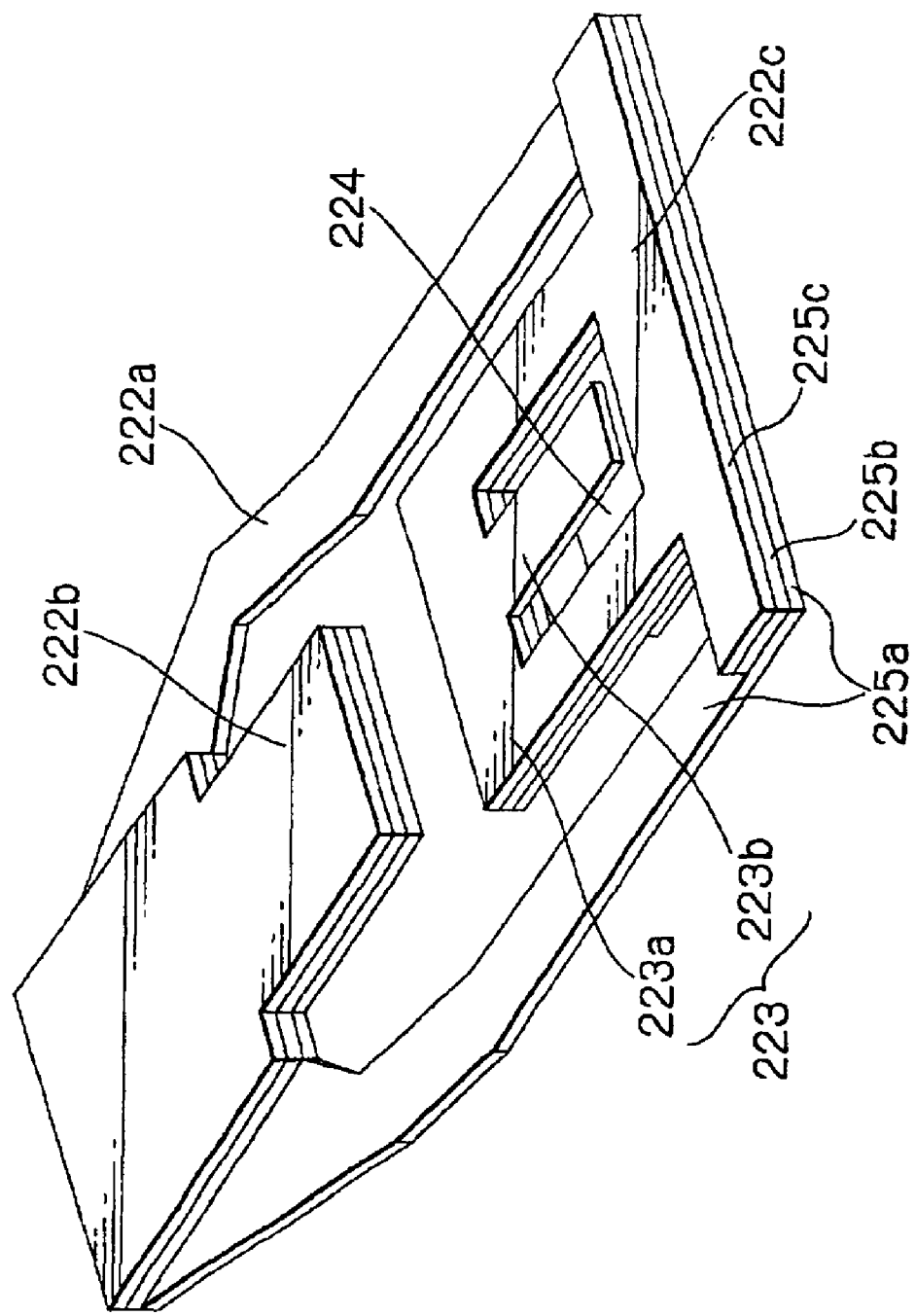
FIG. 25 is an oblique view illustrating only a flexure and a magnetic head slider in the embodiment of FIG. 22.
Figure 26:
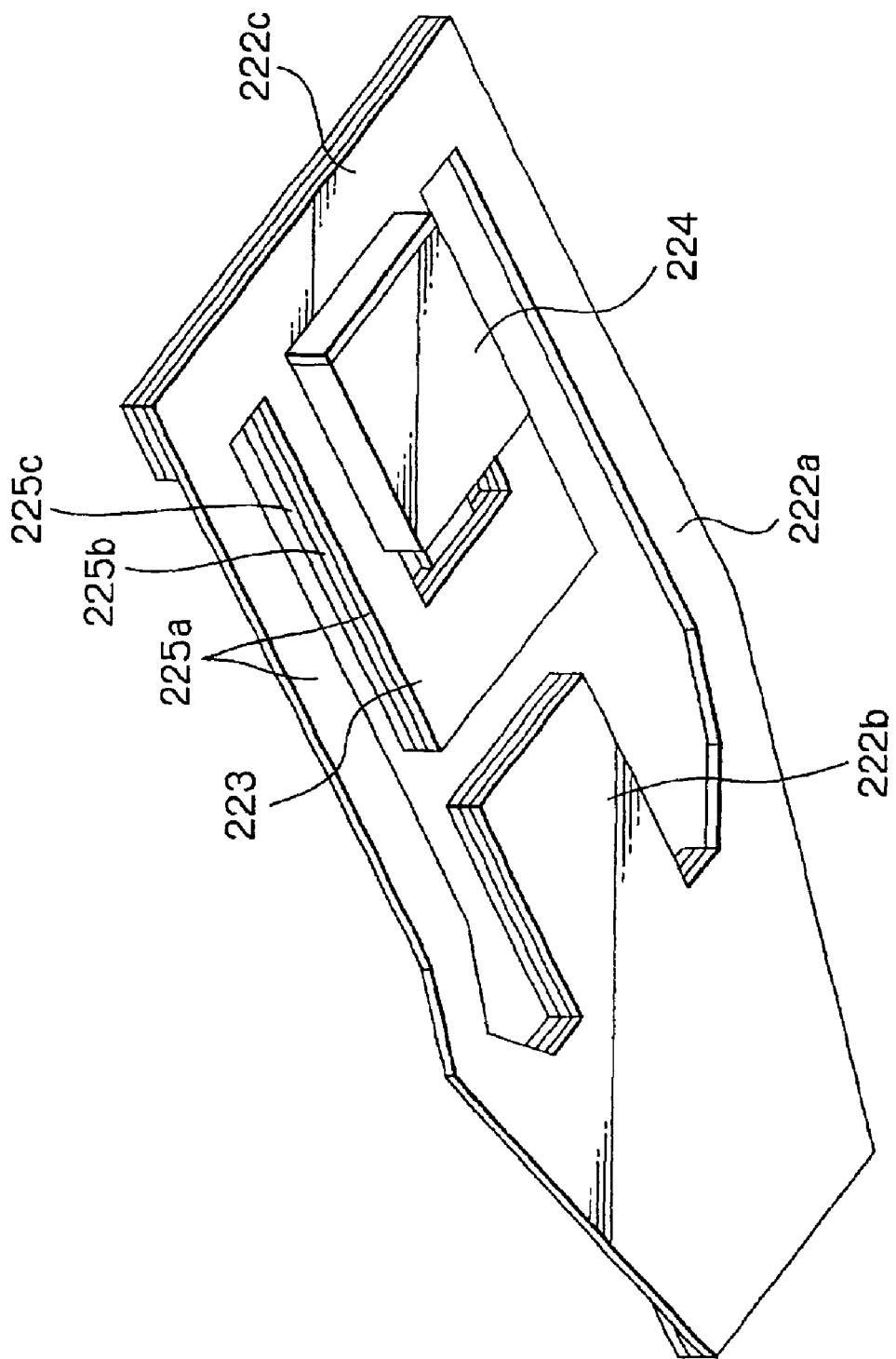
FIG. 26 is an oblique view illustrating only the flexure and the magnetic head slider in the embodiment of FIG. 22, seen from different direction from that of FIG. 25.

FIG. 22 schematically illustrates the whole structure of an HGA in a still further embodiment according to the present invention, FIG. 23 illustrates the HGA in the embodiment of FIG. 22, FIG. 24 is a side view of this HGA in the embodiment of FIG. 22, FIG. 25 illustrates only a flexure and a magnetic head slider in the embodiment of FIG. 22, and FIG. 26 illustrates the flexure and the magnetic head slider seen from different direction from that of FIG. 25.

In this embodiment, the load adjustment mechanism is fabricated unitarily with the flexure. As shown in these figures, a suspension 220 consists of a load beam 221 formed by a plane plate member, the flexure 222 fixed to and supported by the load beam 221 and the load adjustment mechanism 223 united with the flexure 222.

The HGA is configured by fixing a magnetic head slider 224 provided with at least one thin-film magnetic head element to the load adjustment mechanism 223 of the suspension 220, and by executing electrical connection of trace conductors (not shown) to the magnetic head element.

The load beam 221 is made of in this embodiment a single plane metal plate member such as for example a stainless steel plate with a relatively large thickness and has no bending section. Thus, the load beam 221 is configured to have a high stiffness. The fixing of the load beam 221 with the flexure 222 is performed by pinpoint welding at a plurality of points.

The load beam 221 has an attaching hole 221a used for attaching the HGA to a drive arm (not shown) of the HDD at its rear end section, and a projection or dimple 221b that is a load point at its top end section.

The flexure 222 and the load adjustment mechanism 223 in this embodiment are fabricated by sequentially laminating a first stainless steel thin plate 225a, a resin layer 225b made of a polyimide resin for example and a second stainless steel thin plate 225c to form a three-layered plate member, and by etching the three-layered plate member in a predetermined layer or layers and into a predetermined pattern.

In this embodiment, as shown in FIGS. 25 and 26, a midsection 222a of the flexure 222 is configured in a single layer structure of only the first stainless steel thin plate 225a, to have a resilience, and a rear end section 222b and a top end section 222c of the flexure 222 are configured in a three-layered structure of the first stainless steel thin plate 225a, the resin layer 225b and the second stainless steel thin plate 225c. Since the rear end section 222b and the top end section 222c have a three-layered structure, not only their strength can be improved but also a pitch adjustment of the magnetic head slider 224 can be easily performed because a level difference between the rear end section 222b and the top end section 222c and the load adjustment mechanism 223 becomes small. It is desired however that a fixing region of the rear end section 222b of the flexure 222, to be welded to the load beam 221, is configured by a single layer structure of only the second stainless steel thin plate 225c by removing the first stainless steel thin plate 225a and the resin layer 225b.

The load adjustment mechanism 223 is configured by a frame section 223a formed in a rectangular shape and a spring plate section 223b formed in a frame of the frame section 223a. One end of the spring plate section 223b is united with an inside edge of the frame section 223a. The frame section 223a is formed in a three-layered structure of the first stainless steel thin plate 225a, the resin layer 225b and the second stainless steel thin plate 225c to keep a sufficient stiffness. Whereas the spring plate section 223b is formed in a single layer structure of only the second stainless steel thin plate 225c and has a resilience.

The spring plate section 223b is formed to locate directly underneath the dimple 221b namely the load point. When the dimple 221b depresses this resilient spring plate section 223b, this spring plate section 223b becomes deformed and forces back. Thus, the load applied to the magnetic head slider 224 is determined to a value when the both forces are balanced.

In this embodiment, the spring plate section 223b formed directly underneath the dimple 221b provides load adjustment functions. By adjusting a width, a thickness and a length of the spring plate section 223b, a desired load with respect to a given Z-height is obtained. The spring plate section 223b is bent when depressed by the dimple 221b. Thus, it is necessary to form a gap for avoiding abutment of the top end of the spring plate section to the magnetic head slider 224. This gap is provided in this embodiment by the total thickness of the first stainless steel thin plate 225a, and the resin layer 225b.

The electrical conductor member consisting of trace conductors connected to the magnetic head element of the magnetic head slider 224 may be configured by a flexible conductor member with the trace conductors, directly formed on the flexure 222, or by a preliminarily fabricated flexible conductor sheet with the trace conductors, adhered on the flexure 222.

Operations, advantages and modifications in this embodiment are the same as those in the embodiments of FIGS. 1 and 11.

Figure 27:
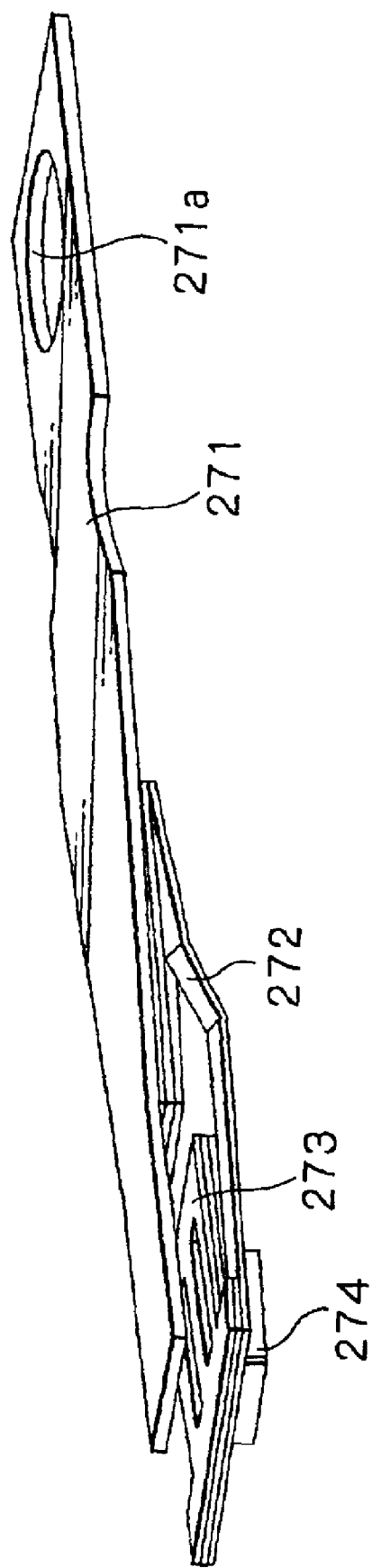
FIG. 27 is an oblique view schematically illustrating the whole structure of an HGA in a still more further embodiment according to the present invention.
Figure 28:
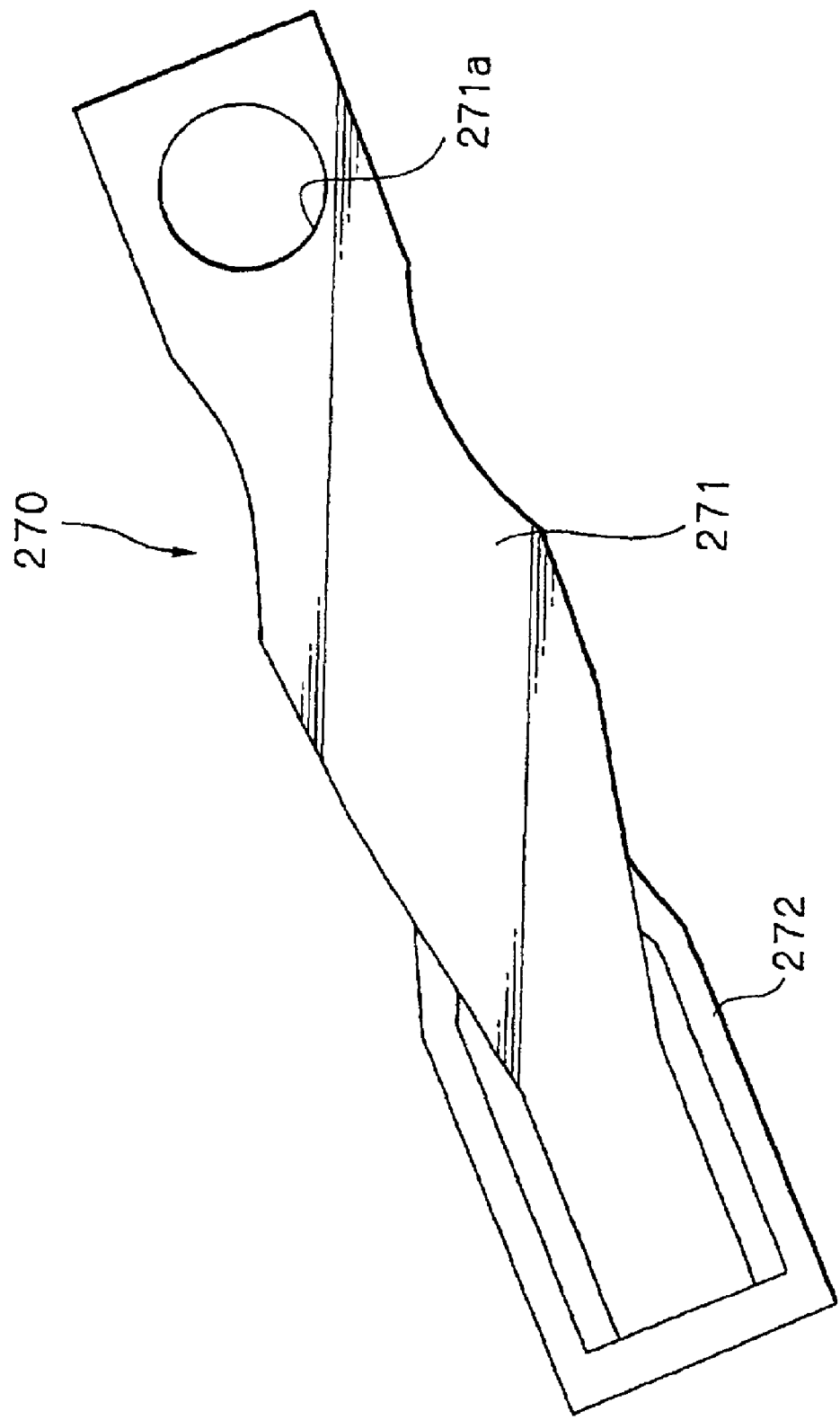
FIG. 28 is a bottom view of the HGA in the embodiment of FIG. 27.
Figure 29:
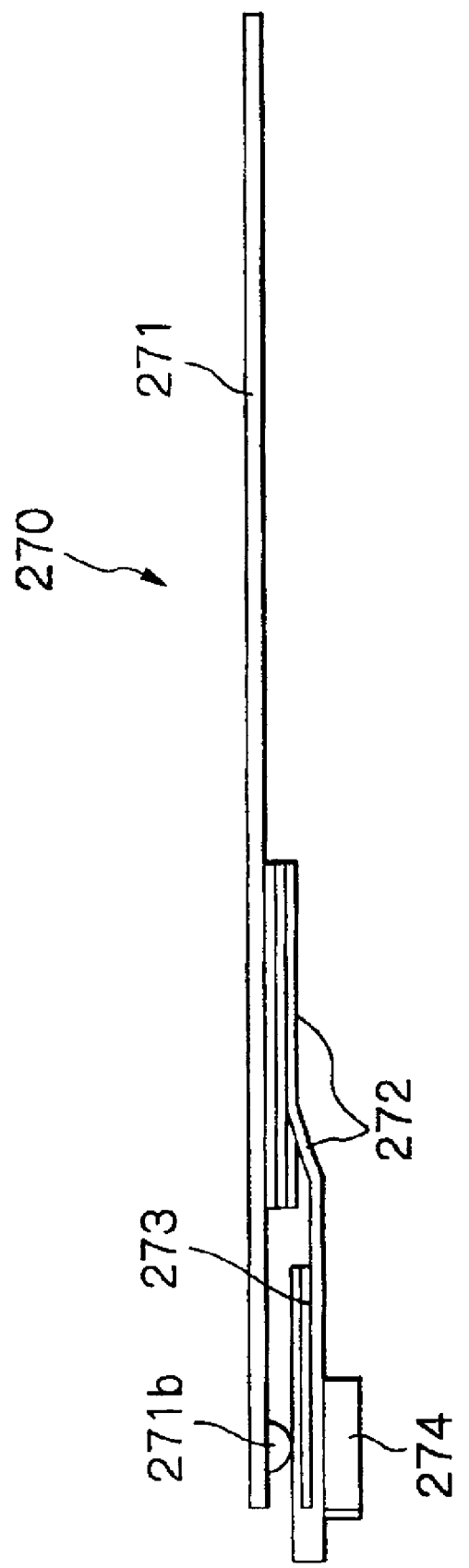
FIG. 29 is a side view of the HGA in the embodiment of FIG. 27.

FIG. 27 schematically illustrates the whole structure of an HGA in a still more further embodiment according to the present invention, FIG. 28 is a bottom view of the HGA in the embodiment of FIG. 27, and FIG. 29 is a side view of the HGA in this embodiment.

At the time of inserting an HGA between magnetic disks in an HDD, it is necessary that a part of a suspension of the HGA can be backwardly bent. In order to provide this back-bending function to the HGA, in this embodiment, a width of a load beam is partially narrowed. The load adjustment mechanism is fabricated unitarily with the flexure.

As shown in these figures, a suspension 270 consists of a load beam 271 formed by a plane plate member, the flexure 272 fixed to and supported by the load beam 271 and the load adjustment mechanism 273 united with the flexure 272.

The HGA is configured by fixing a magnetic head slider 274 provided with at least one thin-film magnetic head element to the load adjustment mechanism 273 of the suspension 270, and by executing electrical connection of trace conductors (not shown) to the magnetic head element.

The load beam 271 is made of in this embodiment a single plane metal plate member such as for example a stainless steel plate with a relatively large thickness. Although the load beam 271 is partially narrowed in width to have a back-bending function, there is no bending section for adjusting a load imposed on the magnetic head slider. Thus, the load beam 271 is configured to have a high stiffness. Therefore, even if the HGA is back bent at the time of assembling the HGA into the HDD, the load imposed on the magnetic head slider will not changed after the assembling. In order to provide a back-bending function, the load beam may be formed in any shape other than the above-mentioned configuration.

The fixing of the load beam 271 with the flexure 272 is performed by pinpoint welding at a plurality of points. The load beam 271 has an attaching hole 271a used for attaching the HGA to a drive arm (not shown) of the HDD at its rear end section, and a projection or dimple 271b that is a load point at its top end section.

The flexure 272 and the load adjustment mechanism 273 in this embodiment are fabricated by sequentially laminating a first stainless steel thin plate, a resin layer made of a polyimide resin for example and a second stainless steel thin plate to form a three-layered plate member, and by etching the three-layered plate member in a predetermined layer or layers and into a predetermined pattern.

As well as the embodiment of FIG. 22, a midsection of the flexure 272 is configured in a single layer structure of only the first stainless steel thin plate to have a resilience, and a rear end section and a top end section of the flexure 272 are configured in a three-layered structure of the first stainless steel thin plate, the resin layer and the second stainless steel thin plate. Since the rear end section and the top end section have a three-layered structure, not only their strength can be improved but also a pitch adjustment of the magnetic head slider 274 can be easily performed because a level difference between the rear end section and the top end section and the load adjustment mechanism 273 becomes small.

The load adjustment mechanism 273 is configured, as well as the embodiments of FIGS. 1 and 22, by a frame section formed in a rectangular shape and a spring plate section formed in a frame of the frame section. One end of the spring plate section is united with an inside edge of the frame section. The frame section is formed in a three-layered structure of the first stainless steel thin plate, the resin layer and the second stainless steel thin plate to keep a sufficient stiffness. Whereas the spring plate section is formed in a single layer structure of only the second stainless steel thin plate and has a resilience.

The spring plate section is formed to locate directly underneath the dimple 271b namely the load point. When the dimple 271b depresses the resilient spring plate section, this spring plate section becomes deformed and forces back. Thus, the load applied to the magnetic head slider 274 is determined to a value when the both forces are balanced.

In this embodiment, the spring plate section formed directly underneath the dimple 271b provides load adjustment functions. By adjusting a width, a thickness and a length of the spring plate section, a desired load with respect to a given Z-height is obtained. The spring plate section is bent when depressed by the dimple 271b. Thus, it is necessary to form a gap for avoiding abutment of the top end of the spring plate section to the magnetic head slider 274. This gap is provided in this embodiment by the total thickness of the first stainless steel thin plate and the resin layer.

The electrical conductor member consisting of trace conductors connected to the magnetic head element of the magnetic head slider 274 may be configured by a flexible conductor member with the trace conductors, directly formed on the flexure 272, or by a preliminarily fabricated flexible conductor sheet with the trace conductors, adhered on the flexure 272.

Operations, advantages and modifications in this embodiment are the same as those in the embodiments of FIGS. 1, 11 and 22.

Figure 30:
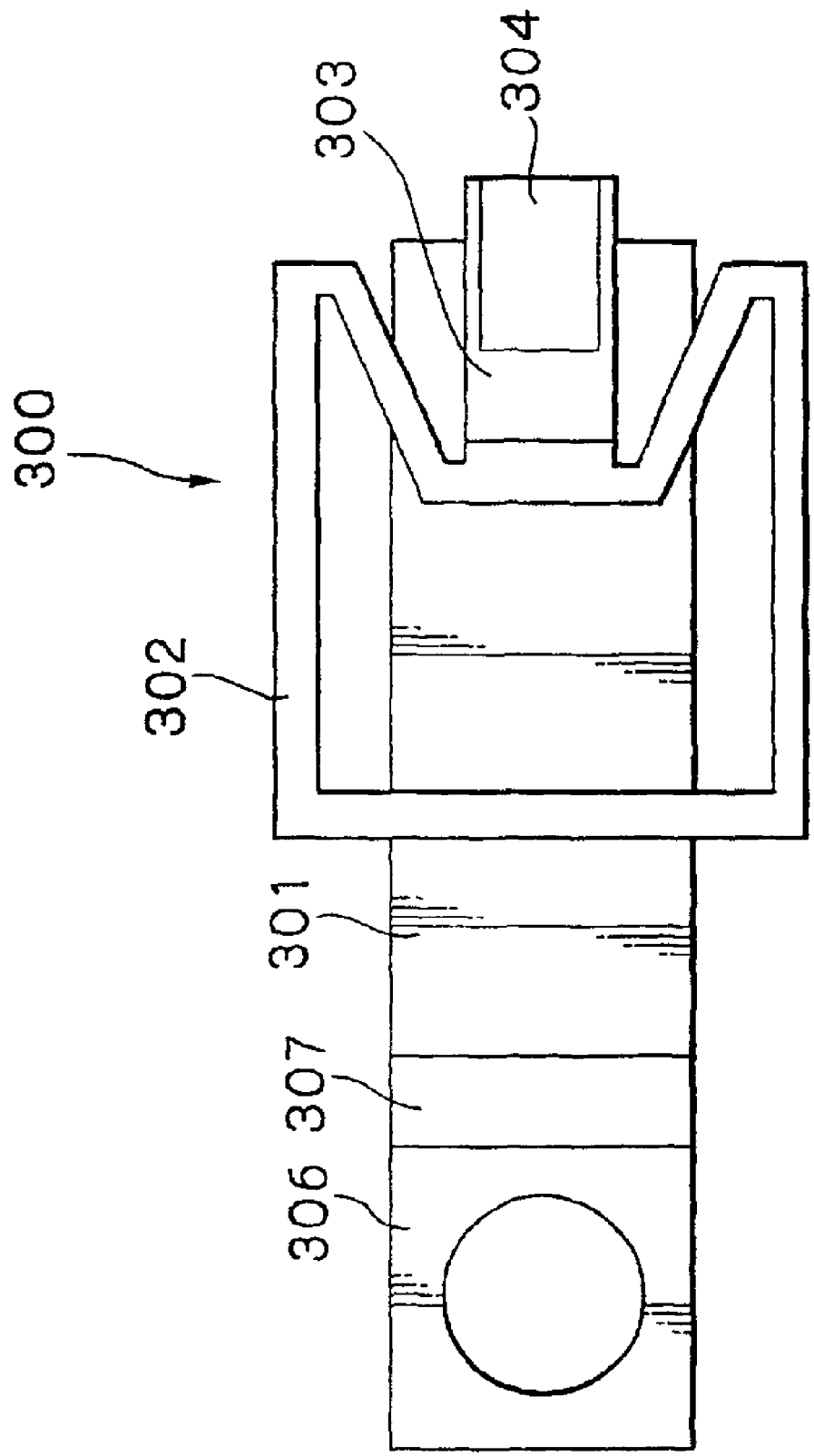
FIG. 30 is an oblique view schematically illustrating the whole structure of an HGA in a further embodiment according to the present invention.
Figure 31A:
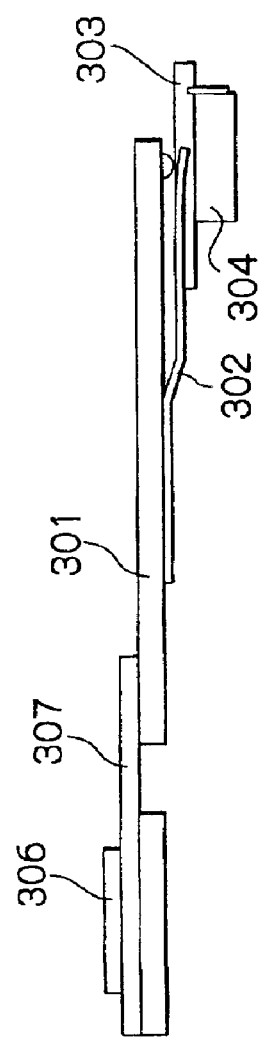
FIGS. 31a to 31d are side views of HGAs in various modifications of the embodiment of FIG. 30.
Figure 31B:
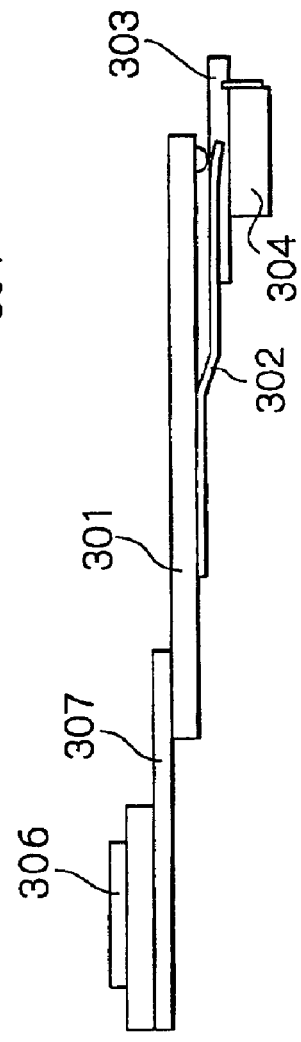
Figure 31C:
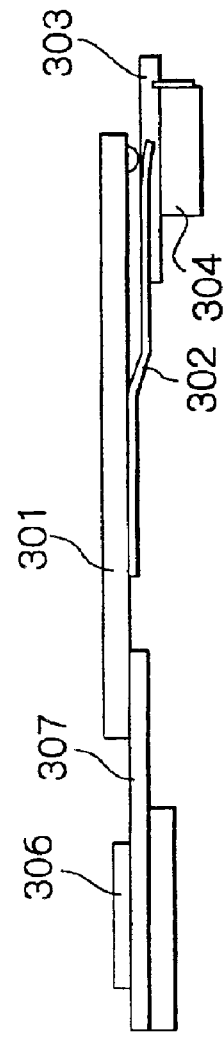
Figure 31D:
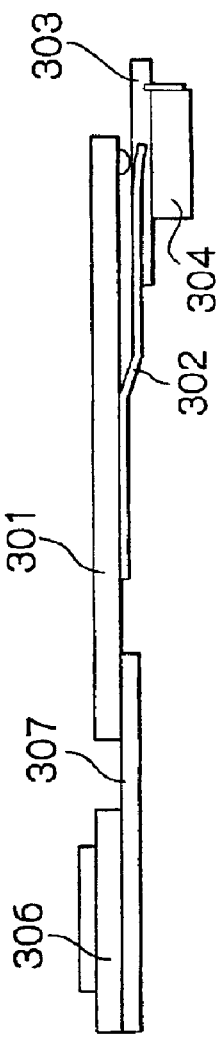

FIG. 30 schematically illustrates the whole structure of an HGA in a further embodiment according to the present invention, and FIGS. 31a to 31d are side views of HGAs in various modifications of the embodiment of FIG. 30.

At the time of inserting an HGA between magnetic disks in an HDD, it is necessary that a part of a suspension of the HGA can be backwardly bent. In order to provide this back-bending function to the HGA, a width of a load beam may be partially narrowed as done in the embodiment of FIG. 27, or a load beam 301 and a base plate 306 individually fabricated may be coupled by a resilient coupling member 307 as this embodiment of FIG. 30.

As shown in FIG. 30, in this embodiment, a suspension 300 is configured by the base plate 306, the load beam 301 formed by a plane plate member, the resilient coupling member 307 for coupling a rear end section of the load beam 301 to the base plate 306, a flexure 302 fixed to and supported by the load beam 301, and a load adjustment mechanism 303 unitarily formed with this flexure 302. The HGA is completed by fixing a magnetic head slider 304 with at least one magnetic head element on the load adjustment mechanism 303 of the suspension 300, and by electrically connecting trace conductors (not shown) to the magnetic head element.

The coupling member 307 that is additionally formed so as to provide the back-bending function utilized at the time of mounting this HGA to the HDD has a higher stiffness than the conventional bending section for adjusting a load imposed on the magnetic head slider, and also the load beam 301 has no such bending section for adjusting a load imposed on the magnetic head slider 304. Therefore, even if the HGA is back bent at the tire of assembling the HGA into the HDD, the load imposed on the magnetic head slider will not changed after the assembling.

Other configurations except for the base plate 306 and the coupling member 307, operations, advantages and modifications in this embodiment are the same as those in the aforementioned embodiments.

Various modifications for coupling the base plate 306 and the load beam 301 by means of the coupling member 307 may be designed. Several examples thereof are illustrated in FIGS. 31a to 31d. The configurations of these examples will be apparent from these figures without explanation.

In the aforementioned embodiments, the suspensions for the thin-film magnetic head elements and the HGAs with the suspensions are described. However, it is apparent that the present invention can be applied to a suspension for a head element such as an optical head element other than the thin-film magnetic head element and an HGA with the suspension.

Many widely different embodiments of the present invention may be constructed without departing from the spirit and scope of the present invention. It should be understood that the present invention is not limited to the specific embodiments described in the specification, except as defined in the appended claims.

What is claimed is:

1. A suspension comprising:
   a load beam;
   a flexure fixed to said load beam for determining a flying attitude of a head slider provided with at least one head element, said flexure having a slider supporting section for supporting said head slider;
   a load adjustment means formed at said slider supporting section of said flexure, said load adjustment means including a frame section and a spring plate section for generating and adjusting a load imposed on said head slider; and
   a spacer member mounted on the frame section and inserted between spring plate section and said head slider, for avoiding abutment of said spring plate section to said head slider.

2. The suspension as claimed in claim 1, wherein said load adjustment means is formed directly underneath a load point onto said head slider.

3. The suspension as claimed in claim 2, wherein a projection formed on said load beam functions as said load point.

4. The suspension as claimed in claim 1, wherein said spring plate section for controlling the load imposed on said head slider, at least one end of said spring plate section being supported by said frame section.

5. The suspension as claimed in claim 4, wherein said load adjustment means is formed by a multilayer structure including a first thin metal plate layer, a resin layer laminated on said first thin metal plate layer and a second thin metal plate layer laminated on said resin layer, and wherein said spring plate section consists of a part of said first or second thin metal plate layer.

6. The suspension as claimed in claim 4, wherein said load adjustment means is formed by a single layer structure of a thin metal plate layer, and wherein said spring plate section consists of a part of said thin metal plate layer.

7. The suspension as claimed in claim 1, wherein said load adjustment means is unitarily formed with said flexure.

8. The suspension as claimed in claim 1, wherein said load adjustment means is individually formed from said flexure.

9. The suspension as claimed in claim 1, wherein said load beam is configured to have a high stiffness.

10. The suspension as claimed in claim 9, wherein said load beam consists of a single plate member.

11. The suspension as claimed in claim 1, wherein said load beam has no load adjustment means for adjusting a load imposed on said head slider.

12. The suspension as claimed in claim 1, wherein said suspension further comprises a back-bending section capable of bending a part of the suspension at the time of mounting of the suspension to a magnetic disk drive apparatus.

13. The suspension as claimed in claim 12, wherein said back-bending section is configured by partially narrowing a width of said load beam.

14. The suspension as claimed in claim 12, wherein said back-bending section is configured by a resilient member coupled to said load beam.

15. The suspension as claimed in claim 1, wherein said at least one head element is at least one thin-film magnetic head element.

16. A head gimbal assembly comprising:

a head slider provided with at least one head element;

a load beam;

a flexure fixed to said load beam for determining a flying attitude of said head slider, said flexure having a slider supporting section for supporting said head slider;

a load adjustment means formed at said slider supporting section of said flexure, said load adjustment means including a frame section and a spring plate section for generating and adjusting a load imposed on said head slider; and a spacer member mounted on said frame section and inserted between said spring plate section and said head slider, for avoiding abutment of said spring plate section to said head slider.

17. The head gimbal assembly as claimed in claim 16, wherein said load adjustment means is formed directly underneath a load point onto said head slider.

18. The head gimbal assembly as claimed in claim 17, wherein a projection formed on said load beam functions as said load point.

19. The head gimbal assembly as claimed in claim 16, wherein said spring plate section for controlling the load imposed on said head slider, at least one end of said spring plate section being supported by said frame section.

20. The head gimbal assembly as claimed in claim 16, wherein said load adjustment means is formed by a multi-layer structure including a first thin metal plate layer, a resin layer laminated on said first thin metal plate layer and a second thin metal plate layer laminated on said resin layer, and wherein said spring plate section consists of a part of said first or second thin metal plate layer.

21. The head gimbal assembly as claimed in claim 16, wherein said load adjustment means is formed by a single layer structure of a thin metal plate layer, and wherein said spring plate section consists of a part of said thin metal plate layer.

22. The head gimbal assembly as claimed in claim 16, wherein said load adjustment means is unitarily formed with said flexure.

23. The head gimbal assembly as claimed in claim 16, wherein said load adjustment means is individually formed from said flexure.

24. The head gimbal assembly as claimed in claim 16, wherein said load beam is configured to have a high stiffness.

25. The head gimbal assembly as claimed in claim 24, wherein said load beam consists of a single plate member.

26. The head gimbal assembly as claimed in claim 16, wherein said load beam has no load adjustment means for adjusting a load imposed on said head slider.

27. The head gimbal assembly as claimed in claim 16, wherein said suspension further comprises a back-bending section capable of bending a part of the suspension at the time of mounting of the suspension to a magnetic disk drive apparatus.

28. The head gimbal assembly as claimed in claim 27, wherein said back-bending section is configured by partially narrowing a width of said load beam.

29. The head gimbal assembly as claimed in claim 27, wherein said back-bending section is configured by a resilient member coupled to said load beam.

30. The head gimbal assembly as claimed in claim 16, wherein said at least one head element is at least one thin-film magnetic head element.

* * * * *

UNITED STATES PATENT AND TRADEMARK OFFICE
CERTIFICATE OF CORRECTION

PATENT NO.   : 6,894,873 B2
DATED        : May 17, 2005
INVENTOR(S)  : Tamon Kasajima et al.

It is certified that error appears in the above-identified patent and that said Letters Patent is hereby corrected as shown below:

Title page,
Item [73], Assignee, change "Sae" to -- SAE --.

Signed and Sealed this

Fourth Day of October, 2005

JON W. DUDAS
*Director of the United States Patent and Trademark Office*